(12) United States Patent
Hill

(10) Patent No.: US 7,030,994 B2
(45) Date of Patent: *Apr. 18, 2006

(54) METHOD AND APPARATUS TO MEASURE FIBER OPTIC PICKUP ERRORS IN INTERFEROMETRY SYSTEMS

(75) Inventor: Henry A. Hill, Tucson, AZ (US)

(73) Assignee: Zygo Corporation, Middlefield, CT (US)

( * ) Notice: Subject to any disclaimer, the term of this patent is extended or adjusted under 35 U.S.C. 154(b) by 180 days.

This patent is subject to a terminal disclaimer.

(21) Appl. No.: 10/366,676

(22) Filed: Feb. 12, 2003

(65) Prior Publication Data

US 2003/0174340 A1 Sep. 18, 2003

Related U.S. Application Data

(60) Provisional application No. 60/356,271, filed on Feb. 12, 2002, provisional application No. 60/356,397, filed on Feb. 12, 2002, provisional application No. 60/372,221, filed on Apr. 12, 2002.

(51) Int. Cl.
*G01B 9/02* (2006.01)
(52) U.S. Cl. ...................................... 356/498; 356/482
(58) Field of Classification Search ................ 356/450, 356/520, 498, 510, 508, 500, 482
See application file for complete search history.

(56) References Cited

U.S. PATENT DOCUMENTS

| | | | |
|---|---|---|---|
| 4,606,638 A | 8/1986 | Sommargren | |
| 4,662,750 A | 5/1987 | Barger | |
| 4,711,573 A | 12/1987 | Wijntjes et al. | |
| 4,790,651 A | 12/1988 | Brown et al. | |
| 4,802,765 A | 2/1989 | Young et al. | |
| 4,859,066 A | 8/1989 | Sommargren | |
| 4,881,816 A | 11/1989 | Zanoni | |
| 5,064,289 A | 11/1991 | Bockman | |
| 5,114,234 A | 5/1992 | Otsuka et al. | |
| 5,151,749 A | 9/1992 | Tanimoto et al. | |
| 5,187,543 A | 2/1993 | Ebert | |
| 5,331,400 A | 7/1994 | Wilkening et al. | |
| 5,408,318 A | 4/1995 | Slater | |
| 5,491,550 A | 2/1996 | Dabbs | |
| 5,663,793 A | 9/1997 | de Groot | |
| 5,724,136 A | 3/1998 | Zanoni | |
| 5,757,160 A | 5/1998 | Kreuzer | |
| 5,764,361 A | 6/1998 | Kato et al. | |
| 5,781,277 A | 7/1998 | Iwamoto | |
| 5,790,253 A | 8/1998 | Kamiya | |
| 5,801,832 A | 9/1998 | Van Den Brink | |
| 5,951,482 A | 9/1999 | Winston et al. | |
| 6,008,902 A | 12/1999 | Rinn | |
| 6,020,964 A | 2/2000 | Loopstra et al. | |
| 6,040,096 A | 3/2000 | Kakizaki | |
| 6,046,792 A | 4/2000 | Van Der Werf et al. | |
| 6,134,007 A | 10/2000 | Naraki et al. | |
| 6,137,574 A | 10/2000 | Hill | |
| 6,157,660 A | 12/2000 | Hill | |
| 6,181,420 B1 | 1/2001 | Badami et al. | |
| 6,201,609 B1 | 3/2001 | Hill et al. | |
| 6,208,424 B1 | 3/2001 | de Groot | |
| 6,236,507 B1 | 5/2001 | Hill et al. | |
| 6,246,481 B1 | 6/2001 | Hill | |
| 6,252,667 B1 * | 6/2001 | Hill et al. ................... 356/487 |
| 6,252,668 B1 | 6/2001 | Hill | |
| 6,271,922 B1 | 8/2001 | Bülow et al. ............... 356/477 |
| 6,271,923 B1 | 8/2001 | Hill | |
| 6,304,318 B1 | 10/2001 | Matsumoto | |
| 6,313,918 B1 | 11/2001 | Hill et al. | |
| 6,330,105 B1 | 12/2001 | Rozelle et al. | |
| 6,541,759 B1 | 4/2003 | Hill | |
| 6,738,143 B1 * | 5/2004 | Chu ......................... 356/450 |
| 2001/0035959 A1 | 11/2001 | Hill | |
| 2002/0048026 A1 | 4/2002 | Isshiki et al. | |
| 2002/0089671 A1 | 7/2002 | Hill | |
| 2003/0090675 A1 | 5/2003 | Fujiwara | |

FOREIGN PATENT DOCUMENTS

| | | |
|---|---|---|
| JP | 7-351078 | 12/1995 |
| JP | 8-117083 | 4/1996 |
| JP | 10-260009 | 9/1998 |

OTHER PUBLICATIONS

Bennett, S.J. . "A Double-Passed Michelson Interferometer." Optics Communications, 4:6, pp. 428-430, 1972.
Wu et al. "Analytical modeling of the periodic nonlinearity in heterodyne interferometry." Applied Optics, 37:28, pp. 6696-6700, 1998.
Hines et al. Sub-Nonometer Laser Metrology—Some Techniques and Models. ESO Conference on High-Resolution Imaging by Interferometry II, pp. 1195-1204, 1991.
Bobroff, Norman. "Recent advances in displacement measuring interferometry." Meas. Sci. Technol. 4, pp. 907-926, 1993.
Oka et al. "Polarization heterodyne interferometry using another local oscillator beam." Optics Communications, 92, pp. 1-5, 1992.
Mauer, Paul. "Phase Compensation of Total Internal Reflection." J. Opt. Soc. Am., 56:9, pp. 1219-1221, 1966/.
Player, M.A. "Polarization properties of a cube-corner reflector." J. Mod. Opt., 35:11, pp. 1813-1820, 1988.
Badami et al. "Investigation of NonLinearity in High Accuracy Heterodyne Laser Interferometry." American Society for Precision Engineering, 1997 Proceedings, 16, pp. 153-156, 1997.
Bobroff, Norman. "Residual errors in laser interferometry from air turbulence and nonlinearity." Applied Optics, 26: 13, pp. 2676-2686, 1987.

* cited by examiner

Primary Examiner—Hwa (Andrew) Lee
(74) Attorney, Agent, or Firm—Fish & Richardson P.C.

(57) ABSTRACT

Methods and apparatus for characterizing and compensating non-cyclic errors in fiber optic pickups in interferometry systems are disclosed.

39 Claims, 15 Drawing Sheets

METHOD AND APPARATUS TO MEASURE FIBER OPTIC PICKUP ERRORS IN INTERFEROMETRY SYSTEMS

CROSS-REFERENCE TO RELATED APPLICATIONS

This application claims priority to the following Provisional Patent Applications: Provisional Patent Application No. 60/356,271, entitled "APPARATUS AND METHOD FOR QUANTIFYING AND COMPENSATING NON-CYCLIC NON-LINEARITY IN INTERFEROMETRY SYSTEMS," filed Feb. 12, 2002; Provisional Patent Application No. 60/356,397, entitled "METHOD AND APPARATUS TO MEASURE FIBER OPTIC PICKUP ERRORS," filed Feb. 12, 2002; and Provisional Patent Application No. 60/372,221, entitled "APPARATUS AND METHOD FOR QUANTIFYING AND COMPENSATING NON-CYCLIC NON-LINEARITY IN INTERFEROMETRY SYSTEMS," filed Apr. 12, 2002. The contents of the aforementioned provisional patent applications are hereby incorporated by reference in their entirety.

BACKGROUND

This invention relates to interferometers, e.g., linear and angular displacement measuring and dispersion interferometers, that measure linear and angular displacements of a measurement object such as a mask stage or a wafer stage in a lithography scanner or stepper system, and also interferometers that monitor wavelength and determine intrinsic properties of gases.

Displacement measuring interferometers monitor changes in the position of a measurement object relative to a reference object based on an optical interference signal. The interferometer generates the optical interference signal by overlapping and interfering a measurement beam reflected from the measurement object with a reference beam reflected from the reference object.

In many applications, the measurement and reference beams have orthogonal polarizations and different frequencies. The different frequencies can be produced, for example, by laser Zeeman splitting, by acousto-optical modulation, or internal to the laser using birefringent elements or the like. The orthogonal polarizations allow a polarizing beam-splitter to direct the measurement and reference beams to the measurement and reference objects, respectively, and combine the reflected measurement and reference beams to form overlapping exit measurement and reference beams. The overlapping exit beams form an output beam that subsequently passes through a polarizer. The polarizer mixes polarizations of the exit measurement and reference beams to form a mixed beam. Components of the exit measurement and reference beams in the mixed beam interfere with one another so that the intensity of the mixed beam varies with the relative phase of the exit measurement and reference beams.

A detector measures the time-dependent intensity of the mixed beam and generates an electrical interference signal proportional to that intensity. Because the measurement and reference beams have different frequencies, the electrical interference signal includes a "heterodyne" signal having a beat frequency equal to the difference between the frequencies of the exit measurement and reference beams. If the lengths of the measurement and reference paths are changing relative to one another, e.g., by translating a stage that includes the measurement object, the measured beat frequency includes a Doppler shift equal to $2vnp/\lambda$, where $v$ is the relative speed of the measurement and reference objects, $\lambda$ is the wavelength of the measurement and reference beams, n is the refractive index of the medium through which the light beams travel, e.g., air or vacuum, and p is the number of passes to the reference and measurement objects. Changes in the phase of the measured interference signal correspond to changes in the relative position of the measurement object, e.g., a change in phase of $2\pi$ corresponds substantially to a distance change L of $\lambda/(2np)$. Distance 2L is a round-trip distance change or the change in distance to and from a stage that includes the measurement object. In other words, the phase $\Phi$, ideally, is directly proportional to L, and can be expressed as $$\Phi = 2pkL, \quad (1)$$

where $$k = \frac{2\pi n}{\lambda}.$$

Unfortunately, the observable interference phase, $\tilde{\Phi}$, is not always identically equal to phase $\Phi$. Many interferometers include, for example, non-linearities such as those known as "cyclic errors." The cyclic errors can be expressed as contributions to the observable phase and/or the intensity of the measured interference signal and have a sinusoidal dependence on the change in for example optical path length 2pnL. In particular, a first order cyclic error in phase has for the example a sinusoidal dependence on $(4\pi pnL)/\lambda$ and a second order cyclic error in phase has for the example a sinusoidal dependence on $2(4\pi pnL)/\lambda$. Higher order cyclic errors can also be present as well as sub-harmonic cyclic errors and cyclic errors that have a sinusoidal dependence of other phase parameters of an interferometer system comprising detectors and signal processing electronics. Different techniques for quantifying such cyclic errors are described in commonly owned U.S. Pat. Nos. 6,137,574, 6,252,688, and 6,246,481 by Henry A. Hill.

There are in addition to the cyclic errors, non-cyclic non-linearities or non-cyclic errors. One example of a source of a non-cyclic error is the diffraction of optical beams in the measurement paths of an interferometer. Non-cyclic error due to diffraction has been determined for example by analysis of the behavior of a system such as found in the work of J.-P. Monchalin, M. J. Kelly, J. E. Thomas, N. A. Kurnit, A. Szöke, F. Zernike, P. H. Lee, and A. Javan, "Accurate Laser Wavelength Measurement With A Precision Two-Beam Scanning Michelson Interferometer," *Applied Optics*, 20(5), 736–757, 1981.

A second source of non-cyclic errors is the effect of "beam shearing" of optical beams across interferometer elements and the lateral shearing of reference and measurement beams one with respect to the other. Beam shears can be caused for example by a change in direction of propagation of the input beam to an interferometer or a change in orientation of the object mirror in a double pass plane mirror interferometer such as a differential plane mirror interferometer (DPMI) or a high stability plane mirror interferometer (HSPMI).

Accordingly, due to errors such as the aforementioned cyclic and non-cyclic errors, the observable interference phase typically includes contributions in addition to $\Phi$. Thus, the observable phase is more accurately expressed as $$\tilde{\Phi} = \Phi + \psi + \zeta, \quad (2)$$

where ψ and ζ are the contributions due to the cyclic and non-cyclic errors, respectively.

In displacement measuring applications, the observable phase is often assumed equal to 2pkL, which allows one to readily determine L from the measured phase. In many cases, this is a reasonable approximation, particularly where the contribution to due cyclic and/or non-cyclic errors are small, or the level of accuracy required by the application is relatively low. However, in applications demanding a high level of precision, cyclic and/or non-cyclic errors should be accounted for. For example, high precision displacement measurement requirements of integrated circuit micro-lithography fabrication have become very demanding, in part because of the small field limitations of imaging systems in steppers and scanners and in part because of the continuing reduction in the size of trace widths on wafers. The requirement of high precision displacement measurement with steppers and scanners is typically served with plane mirror interferometers with one of the external mirrors of the plane mirror interferometers attached to a stage mirror of the stepper or scanner. Because the wafer is typically not flat, the orientation of the wafer stage of a stepper or scanner must also be adjusted in one or more angular degrees of freedom to compensate for the non-flatness of the wafer at exposure sites on a wafer. The combination of the use of plane mirror interferometers and the change in one or more angular degrees of freedom is a source of lateral shear of optical beams across interferometer elements. Effects of beam shears of a reference beam and a measurement beam may be represented effectively as a common mode beam shear and a differential beam shear. The differential beam shear is the difference in lateral shear of reference and measurement and the common mode beam shear is the average lateral shear of the reference and measurement beams.

The cited source of lateral beam shear presents a potentially serious problem in distance measuring interferometry. For a measurement leg length of 1 meter, a typical value for a change in angular orientation of a stage mirror of 0.0005 radians, and a double-pass plane mirror interferometer, the relative lateral shear between the reference and the measurement components of the output beam of the interferometer is 2 millimeters. For a relative lateral shear of 2 millimeters, a beam diameter of 6 millimeters, and wavefront errors in the output beam components of the order of $\lambda/20$, an error will be generated in the inferred distance measurement of $>/\sim 1$ nanometer. This error is a non-cyclic error and can pose a serious limitation to micro-lithographic applications of steppers and scanners in integrated circuit fabrication.

Wavefront errors are produced by imperfections in transmissive surfaces and imperfections in components such as retroreflectors, phase retardation plates, and/or coupling into multi-mode optical fibers that produce undesired deformations of wavefronts of beams.

In dispersion measuring applications, optical path length measurements are made at multiple wavelengths, e.g. 532 nanometers and 1064 nanometers, and are used to measure dispersion of a gas in the measurement path of a distance measuring interferometer. The dispersion measurement can be used to convert a change in optical path length measured by the distance measuring interferometer into a corresponding change in physical length. Such a conversion can be important since changes in the measured optical path length can be caused by gas turbulence and/or by a change in the average density of the gas in the measurement arm even though the physical distance to the measurement object is unchanged.

When working to position-measurement accuracy of approximately 1 nanometers or better and for distance measuring interferometry using dispersion interferometry to correct for the effects of gas in the measuring path, the cited non-cyclic errors are amplified by the reciprocal dispersive power of the gas, $\Gamma$. For the Nb:YAG laser beam with a wavelength of 1064 nm and the frequency doubled Nb:YAG laser with a beam wavelength of 532 nanometers, $\Gamma \cong 75$. For the 633 nanometer HeNe laser beam and a second beam at 316 nanometer, $\Gamma \cong 25$. Thus, for high-accuracy interferometry (accuracy in the 1 nanometer regime or better) it is necessary to reduce the effect of the lateral beam shear induced non-cyclic errors in the dispersion interferometry by approximately two orders of magnitude beyond that required for the corresponding distance measuring interferometry, an accuracy in the 0.01 nanometer regime or better.

Both common mode and differential beam shear can further compromise the accuracy of an interferometer where the interferometer output beam is coupled into a fiber optic pick-up (FOP) to transport the interferometer output beam to a remotely located detector.

SUMMARY

One way to reduce non-cyclic errors in an interferometer is to use extremely high quality optical components. Commercially, this solution is unattractive because of the accompanying increase in cost of the interferometer. Another way to reduce errors is to quantify the errors in the interferometer prior to deploying the interferometer, and then compensate measurements made with the interferometer in its end use application based on the precompiled data.

Quantifying non-cyclic errors associated with an interferometer involves monitoring an observable phase associated with the interferometer output beam while scanning a parameter on which the phase depends. The non-cyclic error contribution to the observable phase is determined from the variation of the observable phase from a reference value, assuming other sources of error are negligible or otherwise compensated. The reference value can be based on another interferometrically generated phase, or can be based on a phase value determined from a mathematical relationship between the observable phase and the parameter being scanned.

Where the reference value is based on another interferometer phase, the reference value can be a redundant phase monitored with a reference interferometer during the scanning. Where the interferometer under test and reference interferometer are configured to monitor the same degree of freedom of the measurement object, the observable phase and redundant phase should be proportional in the absence of non-cyclic errors and other errors. Accordingly, any variation of the observable phase from this relationship can be attributed to the test interferometer non-cyclic errors. Of course, this assumes that the reference interferometer non-cyclic error contribution to the redundant phase measurement is negligible. To ensure this, the reference interferometer can be made using high-quality components to reduce sources of non-cyclic errors in the interferometer. Alternatively, or additionally, the reference interferometer can be operated in a way that reduces non-cyclic errors, e.g., operated a short distance from the measurement object to reduce beam shear, which is a source of non-cyclic errors. Another way to minimize non-cyclic errors in the redundant phase measurement is to use a reference interferometer with known non-cyclic errors. The reference value can then be determined by correcting the observable phase from the reference interferometer with the predetermined non-cyclic error contribution.

Another way to determine a reference value is from a known relationship (e.g., a mathematical formula) relating the scanned parameter to the observable phase. For example, a contribution to the observable phase by the optical path length difference between a measurement beam and a reference beam in an interferometer can be determined from the geometry of the interferometer. This geometric contribution is typically a function of parameters such as the orientation and position of the measurement object with respect to the interferometer. Accordingly, one can monitor the observable phase while scanning one of these parameters, and determine the non-cyclic errors as the variation of the observable phase from the predicted functional dependence of the phase on the scanned parameter.

Characterizing an interferometer's non-cyclic errors in this way yields a phase term that is a function of the scanned parameters. This phase term is referred to as the non-cyclic error function, and may be stored as, for example, a look-up table, as a power series representation, or as a spectral representation such as in a Fourier series. Parameters may include the measurement object's position and/or orientation with respect to the interferometer, the position of the interferometer axis with respect to the pivot axis of the measurement object, beam shear, and directions of propagation of measurement and/or reference beams.

The non-cyclic error function may be stored on some electronic data storage medium (e.g., a memory chip or a disk), which is provided to the interferometer's end user. A control algorithm that runs the interferometer in its end use application accesses the non-cyclic error function from the data storage medium, and compensates the observable phase prior to making downstream calculations based on the phase.

Non-cyclic error functions may be determined for components of interferometers in addition to the whole interferometer assembly. For example, when using a fiber optic pickup (FOP) to transport the interferometer output beam to a remotely positioned detector, artifacts from the interferometer, such as beam shear, can result in additional non-cyclic errors due to coupling the output beam into the FOP. Although these additional non-cyclic errors can be determined for the combined interferometer/FOP assembly, they can also be determined for the FOP alone. Accordingly, in certain aspects, the invention features techniques for characterizing non-cyclic errors associated with interferometer components (e.g., a FOP). The principle for determining the non-cyclic error function for a component is the same as for the interferometer: a system monitors the observable phase generated by an interferometer using the component while scanning a parameter on which the phase depends. The non-cyclic error contribution is determined as the variation of the observable phase from a reference value, assuming that other sources of error are negligible or compensated. In some embodiments, non-cyclic errors in a FOP are measured as functions of differential and common mode beam shear of a two component optical beam, e.g., an output beam of a heterodyne interferometer system.

Important information about the interferometer system in addition to the non-cyclic error function can also be generated in the process of measuring the non-cyclic error function. The additional information may include the measurement axis of the interferometer system as a function of one or more parameters, e.g. the physical length of a measurement path and the directions of propagation of an input beam to the interferometer. For an interferometer assembly including two or more plane mirror interferometers, the process for measuring the non-cyclic error function can also map out the measurement axes for each of the two or more interferometers and may furnish accurate measurement of the separation of the two or more measurement axes. This information may be used to determine changes in angular displacements of the plane mirror measurement object in one or more planes.

Interferometers and interferometer components characterized using the techniques disclosed herein may be used in lithography tools.

Various aspects of the invention are as follows.

In a first aspect, the invention features a method that includes providing a test interferometer which during operation directs two beams along different paths and then combines them to produce an output beam. The output beam includes information about an optical path length difference between the two beams, and imperfections in the test interferometer cause a measurable interferometric test phase derived from the output beam to deviate from the expression $\Phi = pknL$, where p is an integer, k is the wavenumber of the output beam, and nL corresponds to the optical path length difference, wherein the deviation comprises a non-cyclic error term that varies in a nonperiodic way on the optical path length difference. The method further includes using the test interferometer to measure the test phase as a function of a test parameter that causes the optical path length difference to vary, comparing the measured test phase to another expression indicative of the optical path length difference, and determining a representation indicative of the non-cyclic error term for the test interferometer based on the comparison.

The method may include one or more of the following features and/or features of other aspects.

In some embodiments, during operation of the test interferometer at least one of the two beams contacts a measurement object and the test parameter is a distance between the test interferometer and the measurement object. Measuring the test phase as a function of the test parameter can include scanning the position of the measurement object with respect to the test interferometer. The other expression indicative of the optical path length difference can be based on a reference phase that is monitored as a function of the test parameter simultaneously to measuring the test phase. The reference phase can be monitored using a reference interferometer, which during operation directs a first reference interferometer beam to contact the measurement object at least once. Imperfections in the reference interferometer can be sufficiently small so that a non-cyclic error contribution to the reference phase due to the imperfections is negligible compared to the non-cyclic error term of the test interferometer. Alternatively, or additionally, the reference interferometer can be positioned sufficiently close to the measurement object so that a non-cyclic error contribution to the reference phase due to imperfections in the reference interferometer is negligible compared to the non-cyclic error term of the test interferometer. In some embodiments, the method further includes adjusting the position of the reference interferometer with respect to the measurement object to maintain the reference interferometer sufficiently close to the measurement object so that the non-cyclic error contribution to the reference phase is negligible compared to the non-cyclic error term of the test interferometer for a range of the test parameter greater than a maximum distance between the measurement object and the reference interferometer.

The non-cyclic error term can be determined from a deviation of a sum of the test phase and the reference phase from a constant value.

In some embodiments, during operation of the test interferometer at least one of the two beams contacts a measurement object and the test parameter is an angular orientation of the measurement object with respect to the interferometer. Measuring the test phase as a function of the test parameter can include rotating the measurement object about a pivot axis to vary the angular orientation of the measurement object with respect to the test interferometer. The method can also include adjusting the position of the pivot axis and determining the representation for different pivot axis positions. The other expression indicative of the optical path length difference can include a mathematical formula relating the orientation of the measurement object to the optical path length difference. Determining the representation indicative of the non-cyclic error term can include fitting a polynomial to the measured test phase as a function of the test parameter. The non-cyclic error term can be determined from a cubic coefficient and/or higher order coefficients of the fitted polynomial. The method can further include fitting a polynomial to the measured test phase as a function of the test parameter and determining a point on an axis of the test interferometer from the fitted polynomial. The point on the test interferometer axis can be determined from a point at which the first derivative of the fitted polynomial with respect to the test parameter is zero.

In some embodiments, the interferometer derives the two beams from an input beam and the test parameter is a propagation direction of the input beam. Measuring the test phase as a function of the test parameter can include scanning the input beam propagation direction with respect to the test interferometer. Scanning the input beam propagation direction can include directing the input beam to contact a beam steering element prior to the test interferometer and scanning the orientation of the beam steering element with respect to the test interferometer. The other expression indicative of the optical path length difference can be based on a reference phase that is monitored as a function of the orientation of the beam steering element simultaneous to measuring the test phase. The reference phase can be monitored using a reference interferometer that directs a beam to contact the beam steering element and combines that beam with another beam to produce a reference output beam. The reference phase can include information indicative of the orientation of the beam steering element. A non-cyclic error term for the reference interferometer is small compared to that of the test interferometer. Where the non-cyclic error term for the reference interferometer is known, the reference phase can be compensated for contributions from the reference interferometer non-cyclic error term. The test interferometer can separate the input beam into two component beams that exit the interferometer along parallel paths whose separation depends on the input beam propagation direction.

The test interferometer can be a single pass interferometer or a multiple pass interferometer (e.g., a high-stability plane mirror interferometer), an angular displacement interferometer, or a passive zero shear interferometer, and/or can include components such as a dynamic beam steering element or a fiber optic pickup.

The representation can correlate a value for the non-cyclic error term as a function of a correlation parameter that depends on the optical path length difference. The correlation parameter can be the test parameter. The representation can be in the form of a lookup table or an algebraic expression parameterized by the correlation parameter.

In another aspect, the invention features an apparatus that includes a test interferometer which during operation directs two beams along different paths and then combines them to produce an output beam, wherein the output beam comprises information about an optical path length difference between the two beams and imperfections in the interferometer cause a measurable interferometric phase derived from the output beam to deviate from the expression $\Phi=pknL$, where p is an integer, k is the wavenumber of the output beam, and nL corresponds to the optical path length difference, and wherein the deviation includes a non-cyclic error term that varies in a nonperiodic way on the optical path length difference. The apparatus also includes an electronic storage medium providing a representation indicative of the non-cyclic error term for the test interferometer.

Embodiments of the apparatus can include one or more of the following features and/or features of other aspects.

The apparatus can further include an electronic controller configured to couple to the electronic storage medium, wherein during operation the electronic controller corrects the output of the test interferometer based on the representation in the electronic storage medium.

The representation can include information about a deviation of the measured phase from $\Phi=pknL$ as a function of a distance between the test interferometer and a measurement object, as a function of an orientation of a measurement object with respect to the test interferometer, and/or as a function of a position of an axis about which the orientation of the measurement object pivots.

During operation of the apparatus, the test interferometer can derive the two beams from an input beam and the representation comprises information about a deviation of the measured phase from $\Phi=pknL$ as a function of the propagation direction of the input beam.

The interferometer can be a single pass interferometer, a multiple pass interferometer (e.g., a high-stability plane mirror interferometer), an angular displacement interferometer, or a passive zero shear interferometer. The interferometer can include components such as a dynamic beam steering element and/or a fiber optic pickup.

In a further aspect, the invention features a lithography system for use in fabricating integrated circuits on a wafer. The system includes a stage for supporting the wafer, an illumination system for imaging spatially patterned radiation onto the wafer, a positioning system for adjusting the position of the stage relative to the imaged radiation; and the foregoing apparatus for monitoring the position of the wafer relative to the imaged radiation.

In another aspect, the invention features a lithography system for use in fabricating integrated circuits on a wafer. The system includes a stage for supporting the wafer, and an illumination system including a radiation source, a mask, a positioning system, a lens assembly, and the foregoing apparatus, wherein during operation the source directs radiation through the mask to produce spatially patterned radiation, the positioning system adjusts the position of the mask relative to the radiation from the source, the lens assembly images the spatially patterned radiation onto the wafer, and the interferometry system monitors the position of the mask relative to the radiation from the source.

In another aspect, the invention features a beam writing system for use in fabricating a lithography mask, which includes a source providing a write beam to pattern a substrate, a stage supporting the substrate, a beam directing assembly for delivering the write beam to the substrate, a positioning system for positioning the stage and beam directing assembly relative one another, and the foregoing apparatus for monitoring the position of the stage relative to the beam directing assembly.

In a further aspect, the invention features an interferometry method that includes positioning a test interferometer relative to a measurement object, wherein during operation of the test interferometer directs two beams along different paths and then combines them to produce an output beam, wherein at least one of the beams contacts the measurement object and the output beam comprises information about an optical path length difference between the two beams, and imperfections in the interferometer cause a measurable interferometric phase derived from the output beam to deviate from the expression $\Phi=pknL$, where p is an integer, k is the wavenumber of the output beam, and nL corresponds to the optical path length difference, and wherein the deviation comprises a non-cyclic error term that varies in a nonperiodic way on the optical path length difference. The method further includes correcting the measured phase based on a representation indicative of the non-cyclic error term for the test interferometer, and monitoring the position of the measurement object based on the corrected phase.

The method can include one or more of the following features and/or features of other aspects.

The method can be used as part of a lithography method for use in fabricating integrated circuits on a wafer. The lithography method includes supporting the wafer on a moveable stage, imaging spatially patterned radiation onto the wafer, adjusting the position of the stage, and monitoring the position of the stage using the method.

The method can be used as part of another lithography method for use in the fabrication of integrated circuits. The lithography method includes directing input radiation through a mask to produce spatially patterned radiation, positioning the mask relative to the input radiation, monitoring the position of the mask relative to the input radiation using the method, and imaging the spatially patterned radiation onto a wafer.

The method can be used as part of a further lithography method for fabricating integrated circuits on a wafer, where the lithography method includes positioning a first component of a lithography system relative to a second component of a lithography system to expose the wafer to spatially patterned radiation, and monitoring the position of the first component relative to the second component using the method.

In a further aspect, the invention features a method for fabricating integrated circuits, the method including any of the foregoing lithography methods or lithography systems.

In another aspect, the invention features a method for fabricating a lithography mask, which includes directing a write beam to a substrate to pattern the substrate, positioning the substrate relative to the write beam, and monitoring the position of the substrate relative to the write beam using the foregoing interferometry method.

Embodiments of the method can include one or more of the following features and/or features of other aspects.

The measurement object can be mounted on a movable stage and the method can further include adjusting the location of the movable stage to position an alignment artifact on the stage coincident with a rotation axis of the stage, monitoring the output beam phase as a function of the orientation of the movable stage about the axis, and calibrating the test interferometer based on the monitored phase.

Calibrating the test interferometer can include fitting a polynomial (e.g., a quadratic) to the monitored phase. The test interferometer can be calibrated based on coefficients of the fitted polynomial.

In yet a further aspect, the invention features a method including using a fiber optic pickup having an input coupler and a fiber to couple two input beams derived from a common source into the fiber to produce an output beam, wherein the output beam includes information about an optical path length difference between the two input beams, and wherein imperfections in the fiber optic pickup cause a measurable interferometric test phase derived from the output beam to deviate from the expression $\Phi=pknL$, where p is an integer, k is the wavenumber of the output beam, and nL corresponds to the optical path length difference, wherein the deviation includes a non-cyclic error term that varies as a function of a separation of one or both of the input beams from an axis of the input coupler. The method further includes measuring the test phase while varying the separation of at least one of the input beams from the axis, comparing the measured test phase to a reference phase indicative of the optical path difference, and determining a representation indicative of the non-cyclic error term for the fiber optic pickup based on the comparison.

Embodiments of the method can include one or more of the following features and/or features of other aspects.

The reference phase can correspond to the test phase measured when both the input beams are coincident with the axis.

Varying the separation of at least one of the input beams from the axis can include varying the separation between the two input beams or varying the separation of both input beams from the axis as the separation between the input beams is kept constant. The test phase can be measured while varying the separation between the two input beams and wherein the test phase is further measured while varying the separation-of both input beams from the axis as the separation between the input beams is kept constant.

The method can further include separating a progenitor beam into two components, directing the two components along different paths, and then recombining the two components to produce an intermediate beam, wherein the two components of the intermediate beam correspond to the two input beams incident on the fiber optic pickup. Varying the separation of at least one of the input beams from the axis can include varying at least one of the different paths to translate one of the components in the intermediate beam. Varying at least one of the different paths can include translating a mirror used to direct one of the components. The progenitor beam can be separated using a Mach-Zender interferometer that also directs the two components along the different paths, and recombines the components.

Varying the separation of both input beams from the axis as the separation between the input beams is kept constant can include translating the input coupler with respect to the input beams.

In some embodiments, the input coupler includes a focusing element that focuses the two input beams onto a core of the fiber. The input coupler can further include a polarizer that samples a common polarization state of the two input beams.

The method can include rotating the input coupler with respect to the axis and determining the representation for different rotation angles.

The two input beams have orthogonal polarizations. The common source can cause the two input beams to have a heterodyne frequency splitting. The two input beams can spatially overlap one another upon entering the fiber optic pickup. The axis can be parallel to the two input beams.

The representation can correlate a value for the non-cyclic error term as a function of one or more correlation parameters that depends on the separation of one or both of the input beams from an axis of the input coupler. At least one of the correlation parameters can depend on the separation between the two input beams or on the separation of both input beams from the axis as the separation between the input beams is kept constant. The representation can be a lookup table or an algebraic expression parameterized by the one or more correlation parameters.

In general, in another aspect, the invention features a fiber optic pickup apparatus including a fiber optic pickup having an input coupler and a fiber configured to couple two input beams derived from a common source into the fiber to produce an output beam, and an electronic storage medium providing a representation indicative of the non-cyclic error term for the fiber optic pickup. The output beam includes information about an optical path length difference between the two input beams, and wherein imperfections in the fiber optic pickup cause a measurable interferometric phase derived from the output beam to deviate from the expression $\Phi=pknL$, where p is an integer, k is the wavenumber of the output beam, and nL corresponds to an optical path length difference between the component beams, wherein the deviation includes a non-cyclic error term that varies depending on a separation of one or both of the component beams from an axis of the input coupler.

Embodiments of the apparatus can include one or more of the following features and/or features of other aspects.

The apparatus can also include an electronic controller configured to couple to the electronic storage medium, wherein during operation the electronic controller corrects the interferometric phase derived from the output beam of the fiber optic pickup based on the representation in the electronic storage medium.

The input coupler can include a focusing element configured to focus the two input beams to a core of the fiber. In addition, the input coupler can include a polarizer configured to sample a common polarization state of the two input beams.

In a further aspect, the invention features a lithography system for use in fabricating integrated circuits on a wafer. The system includes a stage for supporting the wafer, an illumination system for imaging spatially patterned radiation onto the wafer, a positioning system for adjusting the position of the stage relative to the imaged radiation, and an interferometry system including the foregoing fiber optic pick apparatus for monitoring the position of the wafer relative to the imaged radiation.

In another aspect, the invention features a lithography system for use in fabricating integrated circuits on a wafer, the system including a stage for supporting the wafer and an illumination system having a radiation source, a mask, a positioning system, a lens assembly, and an interferometry system including the foregoing fiber optic pickup apparatus, wherein during operation the source directs radiation through the mask to produce spatially patterned radiation, the positioning system adjusts the position of the mask relative to the radiation from the source, the lens assembly images the spatially patterned radiation onto the wafer, and the interferometer and apparatus monitors the position of the mask relative to the radiation from the source.

In a further aspect, the invention features a beam writing system for use in fabricating a lithography mask. The beam writing system includes a source providing a write beam to pattern a substrate, a stage supporting the substrate, a beam directing assembly for delivering the write beam to the substrate, a positioning system for positioning the stage and beam directing assembly relative one another, and an interferometry system including the foregoing fiber optic pickup apparatus for monitoring the position of the stage relative to the beam directing assembly.

In general, in another aspect, the invention features an interferometry method including positioning an interferometer relative to a measurement object, transporting an output beam with a fiber optic pickup to a detector positioned at a location remote from the interferometer, correcting a measured phase based on a representation indicative of a non-cyclic error term for the fiber optic pickup, and monitoring the position of the measurement object based on the corrected phase. During operation the interferometer directs two beams along different paths and then combines them to produce the output beam, wherein at least one of the beams contacts the measurement object and the output beam comprises information about an optical path length difference between the two beams. Furthermore, imperfections in the fiber optic pickup cause the measurable interferometric phase derived from the output beam to deviate from the expression $\Phi=pknL$, where p is an integer, k is the wavenumber of the output beam, and nL corresponds to the optical path length difference, wherein the deviation includes the non-cyclic error term that depends on the separation of the output beam components from an axis of the fiber optic pickup.

In another aspect, the invention features a lithography method for use in fabricating integrated circuits on a wafer, the method including supporting the wafer on a moveable stage, imaging spatially patterned radiation onto the wafer, adjusting the position of the stage, and monitoring the position of the stage using the foregoing interferometry method.

In a further aspect, the invention features a lithography method for use in the fabrication of integrated circuits including directing input radiation through a mask to produce spatially patterned radiation, positioning the mask relative to the input radiation, monitoring the position of the mask relative to the input radiation using the foregoing interferometry method, and imaging the spatially patterned radiation onto a wafer.

In yet a further aspect, the invention features a lithography method for fabricating integrated circuits on a wafer including positioning a first component of a lithography system relative to a second component of a lithography system to expose the wafer to spatially patterned radiation, and monitoring the position of the first component relative to the second component using the foregoing interferometry method.

In yet a further aspect, the invention features a method for fabricating integrated circuits, the method including one of the foregoing lithography methods.

In another aspect, the invention features a method for fabricating a lithography mask, the method including directing a write beam to a substrate to pattern the substrate, positioning the substrate relative to the write beam, and monitoring the position of the substrate relative to the write beam using the foregoing interferometry method.

Embodiments of the invention can include one or more of the following advantages.

Characterizing interferometers and/or interferometer components using the techniques disclosed herein can improve interferometer accuracy in their end-use applications. Accuracy improvement comes from compensating for the contribution of non-cyclic errors to the measured phase. This also can allow for the use of interferometer and interferometer components in high precision applications where non-cyclic errors would otherwise render the interferometer and/or components too inaccurate. Accordingly, interferometers and/or components can be used in applications that would otherwise require higher quality components to provide a desired level of accuracy. Because lesser quality components are typically cheaper than high quality counterparts, the techniques can provide a cost savings.

Unless otherwise defined, all technical and scientific terms used herein have the same meaning as commonly understood by one of ordinary skill in the art to which this invention belongs. In case of conflict with publications, patent applications, patents, and other references mentioned incorporated herein by reference, the present specification, including definitions, will control.

Other features, objects, and advantages of the invention will be apparent from the following detailed description.

DESCRIPTION OF DRAWINGS

FIG. 6 is a schematic diagram of an interferometer for measuring the orientation of a measurement object.

DETAILED DESCRIPTION

Figure 1:
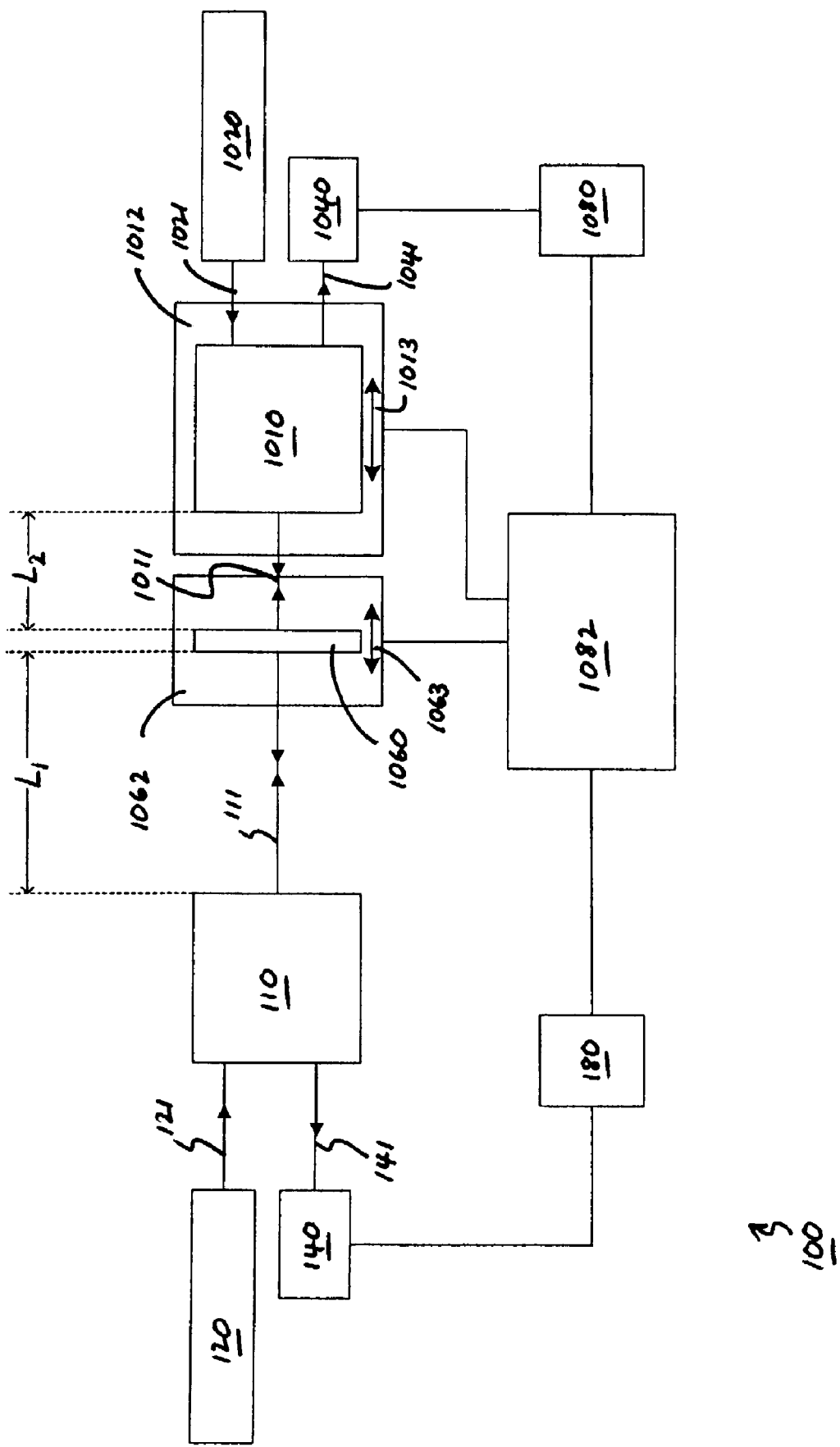
FIG. 1 is a schematic diagram of a system for characterizing non-cyclic errors of an interferometer as a function of displacement.

Referring to FIG. 1, a system 100 is used to characterize non-cyclic errors associated with an interferometer 110. During operation, interferometer 110 accepts an input beam 121 from a light source 120, and directs a measurement beam 111 to reflect from a plane mirror measurement object 1060. Interferometer 110 overlaps the reflected measurement beam with a reference beam to form an output beam 141, which is detected by a detector 140. An electronic processor 180 monitors the intensity of output beam 141, and a computer 1082 determines an interference phase based on variations in the monitored intensity. The observed interference phase, $\tilde{\Phi}_{110}(L_1)$, can be expressed as $$\tilde{\Phi}_{110}(L_1) = 2pkL_1 + \zeta_{110}(L_1), \tag{3}$$

where $L_1$ is the distance between interferometer 110 and the surface of measurement object 1060 that reflects measurement beam 111, and $\zeta_{110}(L_1)$ is the non-cyclic error contribution from interferometer 110. The dependence of $\zeta_{110}(L_1)$ and $\tilde{\Phi}_{110}(L_1)$ on $L_1$ is indicated explicitly because $L_1$ is the scanned parameter in system 100.

Measurement object 1060 is mounted on a stage 1062 that translates the measurement object in a direction 1063 parallel to measurement beam 111. Accordingly, computer 1082 can monitor phase $\tilde{\Phi}_{110}(L_1)$ while scanning measurement object 1060 over a range of values of $L_1$.

System 100 also includes a reference interferometer 1010, which is mounted on a stage 1012 capable of translating interferometer in a direction 1013 parallel to measurement beam 1011. Direction 1013 is parallel to direction 1063. Interferometer 1010 accepts an input beam 1021 from a second source 1020 and directs measurement beam 1011 to reflect from plane mirror measurement object 1060. Interferometer 1010 overlaps the reflected measurement beam with a reference beam, and directs the overlapping beams, shown as output beam 1041, toward a second detector 1040.

A second electronic processor monitors the intensity of output beam 1041, and computer 1082 determines an interference phase, $\tilde{\Phi}_{1010}(L_2)$, based on variations in the monitored intensity. This interference phase can be expressed as $$\tilde{\Phi}_{1010}(L_2) = 2pkL_2 + \zeta_{1010}(L_2). \tag{4}$$

In Eq. (4), $L_2$ is the distance between interferometer 1010 and the surface of measurement object 1060 that reflects measurement beam 1011. $\zeta_{1010}(L_2)$ is the non-cyclic error contribution to phase $\tilde{\Phi}_{1010}(L_2)$ from interferometer 1010. In preferred embodiments, reference interferometer 1010 is constructed from high quality components in order to minimize $\zeta_{1010}(L_2)$. Moreover, $L_2$ is small to further reduce the magnitude of $\zeta_{1010}(L_2)$, assuming the non-cyclic errors increase with increasing $L_2$. Accordingly, the non-cyclic errors associated with interferometer 1010 are negligible and $\zeta_{1010}(L_2) \approx 0$. The stage at which $\zeta_{1010}(L_2)$ can be considered negligible depends upon the required level of precision in the end use application of interferometer 110. Typically, $\zeta_{1010}(L_2)$ should be less than about 10 percent of $\zeta_{110}(L_1)$ (e.g., less than about five percent, three percent, two percent, one percent), for $\zeta_{1010}(L_2)$ to be considered negligible.

While stage 1062 scans the position of measurement object 1060, $L_1 + L_2$ remains constant, which implies that $$\tilde{\Phi}_{110}(L_1) + \tilde{\Phi}_{1010}(L_2) = K + \zeta_{110}(L_1), \tag{5}$$

where $K = 2pk(L_1 + L_2)$ is a constant over a range of $L_1$. According to Eq. (5), variations in $\tilde{\Phi}_{110}(L_1) + \tilde{\Phi}_{1010}(L_2)$ as the system scans over a range of $L_1$ can be attributed to $\zeta_{110}(L_1)$, provided that $\zeta_{1010}(L_2) \approx 0$. However, in order that $\zeta_{1010}(L_2) \approx 0$ be satisfied, $L_2$ should remain small over the scanning range of $L_1$.

Typically, $L_2$ is maintained small compared to the maximum value of $L_1$ at which interferometer 110 is expected to operate in an end use application. For example, $L_2$ can maintained a distance less than about 20 percent of the maximum value of $L_1$ (e.g., about 15 percent, about 10 percent, about five percent, about three percent). In some embodiments, $L_2$ can be less than about 20 centimeters (e.g., 15 centimeters, 10 centimeters, five centimeters, three centimeters, two centimeters or less).

Figure 2A:
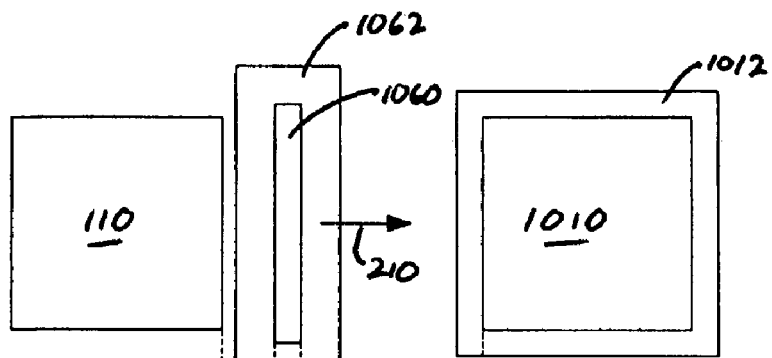
FIGS. 2(a)–2(c) are schematic diagrams showing the system of FIG. 1 at different stages during a characterization process.

To accomplish this, the $L_1$ dependence of non-cyclic error function $\zeta_{110}(L_1)$ is measured by operating system 100 in a "step and repeat mode." Referring to FIG. 2(a), initially stage 1063 positions measurement object 1060 a minimum distance, $L_1(t_0)$, from interferometer 110. At this time, stage 1012 positions interferometer 1010 a distance $L_2(t_0)$ from measurement object 1060. $L_2(t_0)$ is sufficiently small so that $\zeta_{1010}(L_2) \cong 0$ for $L_2 \leq L_2(t_0)$. The system scans measurement object 1060 in a direction 210 towards interferometer 1010 while monitoring $\tilde{\Phi}_{110}(L_1)$ and $\tilde{\Phi}_{1010}(L_2)$ until $L_1 = L_1(t_1)$. Accordingly, variations of $\tilde{\Phi}_{110}(L_1) + \tilde{\Phi}_{1010}(L_2)$ from a constant value, $K_1$, are attributed to $\zeta_{110}(L_1)$, enabling the system to acquire data corresponding to $\zeta_{110}(\tilde{\Phi}_{110})$ for $\tilde{\Phi}_{110}(L_1(t_0))$ to $\tilde{\Phi}_{110}(L_1(t_1))$. The constant value $K_1$ can be determined from the initial observable phase values, i.e., $K_1 = \tilde{\Phi}_{110}(L_1(t_0)) + \tilde{\Phi}_{1010}(L_2(t_0))$. Note that where $L_1(t_0)$ is sufficiently small, $\zeta_{110}(L_1)$ can be negligible, in which case $\tilde{\Phi}_{110}(L_1(t_0)) \cong 2pkL_1(t_0)$ and the non-cyclic error function $\zeta_{110}(L_1)$ can be determined as a function of $L_1$ instead of the observable phase $\tilde{\Phi}_{110}(L_1)$.

Figure 2B:
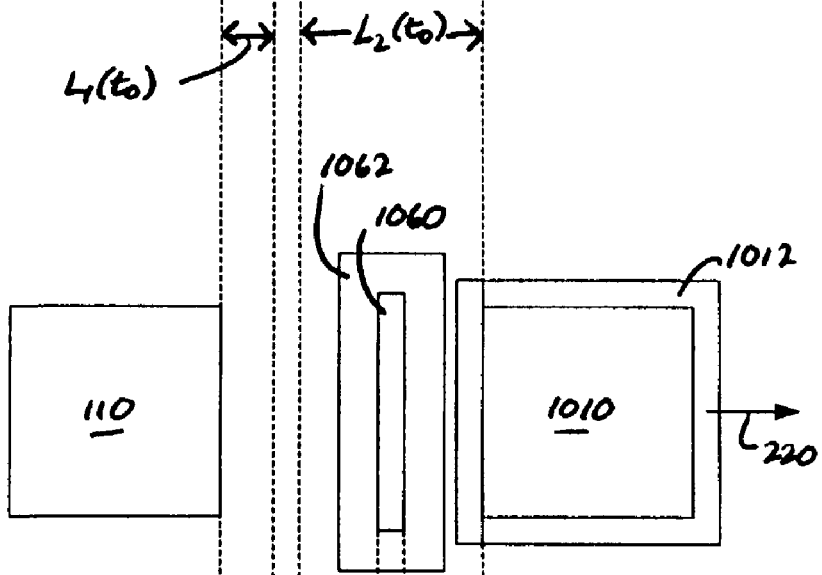

Referring now to FIG. 2(b), at time $t_1$, the system stops scanning measurement object 1060. Stage 1012 translates interferometer 1010 in direction 220 away from measurement object 1060. During the translating, object 1060 remains stationary, leaving $L_1 = L_1(t_1)$. Because the measurement object remains stationary during the translating, the system can monitor the amount stage 1012 translates interferometer 1010 by monitoring phase $\tilde{\Phi}_{1010}(L_2)$. Stage 1012 translates interferometer 1010 by an amount, b, to a new position where $L_2 = L_2(t'_1)$. In some embodiments, $L_2(t'_1)$ is equal to $L_2(t_0)$, although in general, $L_2(t'_1)$ can be greater or less than $L_2(t_0)$, provided $L_2(t'_1)$ is sufficiently small so that $\zeta_{1010}(L_2(t'_1)) \cong 0$.

Figure 2C:
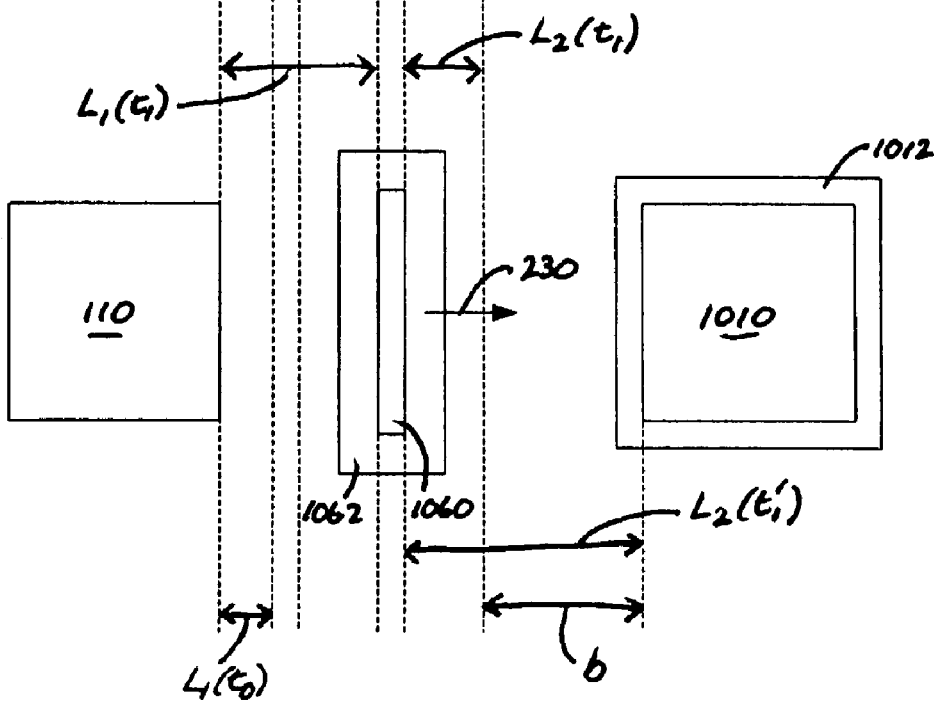

Referring to FIG. 2(c), after repositioning interferometer 1010, the system again scans measurement object 1060 towards interferometer 1010. (direction 230) while simultaneously monitoring $\tilde{\Phi}_{110}(L_1)$ and $\tilde{\Phi}_{1010}(L_2)$. The system again determines $\zeta_{110}(\tilde{\Phi}_{110}(L_1))$ over a new range of $L_1$ from the variation of $\tilde{\Phi}_{110}(L_1)$ from a constant $K_2 = \tilde{\Phi}_{110}(L_1(t_1)) + \tilde{\Phi}_{1010}(L_2(t'_1))$.

The steps of monitoring $\tilde{\Phi}_{110}(L_1)$ and $\tilde{\Phi}_{1010}(L_2)$ while scanning measurement object 1060 and repositioning interferometer 1010 are repeated until the total displacement of measurement object 1060 as seen by interferometer 10 covers the $L_1$ range used in an end use application of interferometer 10. Another way of visualizing non-cyclic error function $\zeta_{110}(L_1)$ is as the departure of the measured phase $\tilde{\Phi}_{110}(L_1)$ from a linear scale formed by the sequence of measured phases $\tilde{\Phi}_{1010}(L_2)$ of interferometer 1010.

In embodiments where interferometer 1010 is translated by an equal increment each step (e.g., b), any contribution to $\tilde{\Phi}_{1010}(L_2)$ from $\zeta_{1010}(L_2)$ should be periodic in the translation increment. Such a contribution will be apparent from a power spectrum analysis of the stitched together $\tilde{\Phi}_{1010}(L_2)$ dataset. Such periodic contributions to $\tilde{\Phi}_{1010}(L_2)$ can be reduced by using smaller step increments, or using non-equal step increments.

The measured non-cyclic error function $\zeta_{110}(L_1)$ may vary depending on the alignment an optical axis of interferometer 110 with input beam 121 and measurement object 1060. Accordingly, the optical axis of interferometer 110 may be determined from a set of non-cyclic error functions determined for different orientations of interferometer 110 in system 100. One approach to selecting an optical axis of interferometer 110 is to minimize quadratic and higher order components to $\zeta_{110}(L_1)$. In other words, the axis may be selected from the alignment which yields the best linear fit to the measured $L_1$ dependence of non-cyclic error function $\zeta_{110}(L_1)$ according to a least squares analysis.

In general, the non-cyclic error function $\zeta_{110}$ can include contributions originating from other components in system 100 in addition to interferometer 110. For example, $\zeta_{110}$ can include a contribution generated by errors in the figure of plane mirror measurement object 1060. The errors in the figure that are of interest are those errors corresponding to the portions of plane mirror 1060 contacted by measurement beams 111 and 1011. The figure of the portions of measurement object 1060 can be measured and subsequently used in electronic processors 180, 1080 and computer 1082 to calculate and eliminate the corresponding contribution to non-cyclic error function $\zeta_{110}$. The calculation of the corresponding contribution uses procedures known to those skilled in the art for tracking properties of a beam through an optical system introduces optical aberrations.

The figure of the portions of measurement object 1060 can be characterized, for example, using a Fizeau interferometer. The figure of the portions of plane mirror 1060 may also be determined by techniques such as described in commonly owned U.S. patent application Ser. No. 09/853,114 entitled "IN-SITU STAGE MIRROR CHARACTERIZATION," filed May 10, 2001 by Henry A. Hill.

Non-cyclic error function $\zeta_{110}$ may further include a contribution generated by wavefront errors in input beam 121 or 1021. The wavefront errors can be measured and subsequently used in electronic processor 180 and computer 1082 to calculate and eliminate the corresponding contribution to non-cyclic error function $\zeta_{110}$. The calculation of the corresponding contribution uses procedures known to those skilled in the art for tracking properties of a beam having wavefront errors through an optical system.

The wavefront errors for the components of input beam 121 are measured as a function of path lengths characteristic of path lengths in interferometer 110 using, for example, a Hartman-Shack interferometer. The wavefront errors measured as a function of the path lengths may also be determined by interferometric techniques in which the phase of portions of the wavefronts are mixed and detected to generate an electrical interference signal.

Another potential source of errors are time-varying effects of gas in the measurement paths of the measurement beams 121 and 1021. These errors can be compensated using techniques described in U.S. patent application Ser. No. 10/294,158 entitled "COMPENSATING FOR EFFECTS OF VARIATIONS IN GAS REFRACTIVITY IN INTERFEROMETERS," filed Nov. 14, 2002, U.S. patent application Ser. No. 10/309,394 entitled "COMPENSATING FOR EFFECTS OF NON-ISOTROPIC GAS MIXTURES IN INTERFEROMETERS," filed on Dec. 3, 2002 and U.S. patent application Ser. No. 10/350,522 entitled "METHOD AND APPARATUS FOR COMPENSATION OF TIME-VARYING OPTICAL PROPERTIES OF GAS IN INTERFEROMETRY" filed Jan. 24, 2003, all by Henry A. Hill.

The observed phase can also be compensated for contributions from cyclic errors. In order to compensate for these contributions, a cyclic error compensating system can be used to determine a cyclic error function characterizing the cyclic error contribution to the observed phase. In some embodiments, system 100 can include a cyclic error compensating system, providing a single apparatus for characterizing non-cyclic and cyclic errors associated with an interferometer. Examples of cyclic error compensating systems are described in U.S. patent application Ser. No. 10/287,898 entitled "INTERFEROMETRIC CYCLIC ERROR COMPENSATION" filed Nov. 5, 2002 by Henry A. Hill, and U.S. patent application Ser. No. 10/174,149 and entitled "INTERFEROMETRY SYSTEM AND METHOD EMPLOYING AN ANGULAR DIFFERENCE IN PROPAGATION BETWEEN ORTHOGONALLY POLARIZED INPUT BEAM COMPONENTS" filed Jun. 17, 2002 by Peter de Groot and Henry A. Hill.

System 100 maintains the orientation of measurement object 1060 fixed with respect to the interferometer measurement beams. However, in many interferometry applications, the orientation of the measurement object can vary while the interferometry system monitors the object's position. Typically, a variation in the orientation of the measurement object will cause a change in the observable phase. For most applications, the effect of the measurement object orientation on the physical path length difference between the interferometer measurement and reference beams can be determined from the interferometer geometry. Accordingly, this geometric contribution to the observable interference phase can be determined by monitoring the measurement object orientation during the displacement measurement. However, the non-cyclic error function can also depend on the measurement object orientation. Thus, for high precision measurements in which the orientation of the measurement object can vary, the dependence of the non-cyclic error function on measurement object orientation should be known in order to appropriately correct the observed phase.

Figure 3:
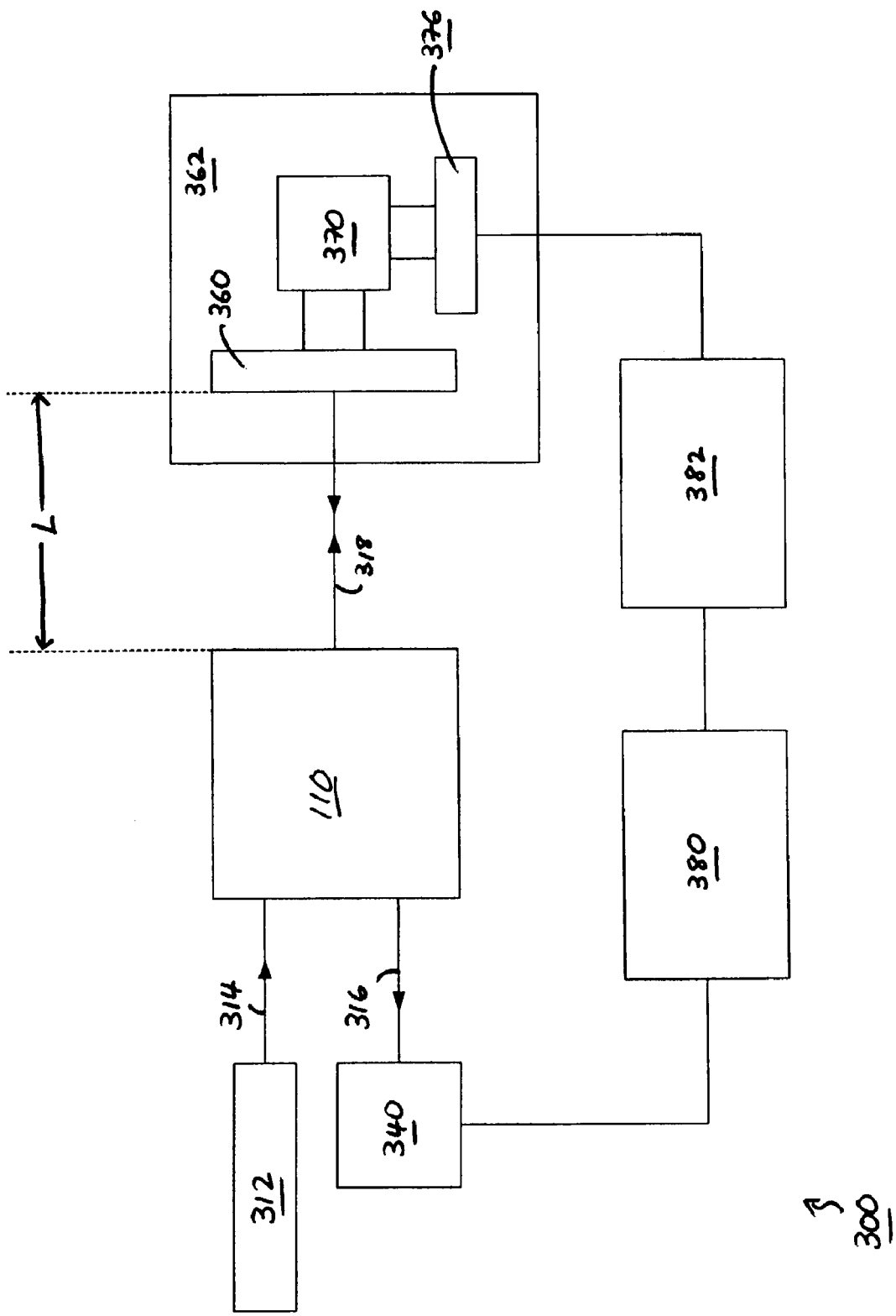
FIG. 3 is a schematic diagram of a system for characterizing non-cyclic errors of an interferometer as a function of orientation and position of a measurement object.

Referring to FIG. 3, a system 300 is used to characterize the dependence of non-cyclic errors associated with interferometer 110 on the orientation of a plane mirror measurement object 360. In addition to interferometer 110 and measurement object 360, system 300 includes a source 312 and a detector 340. Detector 340 is in communication with a computer 382 via an electronic processor 380. Measurement object 360 is mounted on a translation stage 362, which can scan the position of the measurement object to vary a distance L between interferometer 110 and the measurement object. Measurement object 360 is also coupled to a first transducer 370, which can pivot the measurement object about an axis orthogonal to the plane of FIG. 3, thereby varying the orientation of the measurement object with respect interferometer 110. In addition, transducer 370 is coupled to a second transducer 376 which can vary the location of the pivot axis with respect to the axis of interferometer 110. Transducer 370 is configured so that changes in the angular orientation of measurement object 360 about the pivot axis can be made without changing the position of the pivot axis as the transducer 370 changes the orientation of measurement object 360.

During operation of system 300, source 312 directs an input beam 314 toward interferometer 110. Interferometer 110 directs a measurement beam 318 to reflect from measurement object 360, and overlaps the reflected measurement beam with a reference beam. Measurement beam 318 may make one or more passes to measurement object 360, depending on the type of interferometer being characterized. Prior to the reflected measurement beam exiting interferometer 110, the interferometer overlaps the measurement beam with a reference beam also derived from the input beam. The overlapping beams exit interferometer 110 as output beam 316, which is detected by detector 340. Electronic processor 380 monitors changes in the detected intensity of output beam 316 and computer 382 determines an interference phase from the variations. To determine the dependence of $\zeta_{110}$ on the orientation of the measurement object, transducer 370 scans the orientation of measurement object 360 about the pivot axis while computer 382 records the interference phase. Both the location of the pivot axis and L remain fixed during this scan. The computer determines $\zeta_{110}$ from the deviation of the phase from the form of the geometric term. By moving measurement object relative to interferometer 110 with stage 362 and moving the location of the pivot axis with transducer 376, the non-cyclic error function's dependence on the measurement object orientation can be determined for a range of L's and positions of the pivot axis. These ranges can be selected to cover the anticipated ranges for the interferometer's end use application.

The angular orientation of measurement object 360 can be determined using a reference interferometer or from a calibration function relating the angular orientation to the voltage applied to transducer 370. A reference interferometer typically has a small non-cyclic error function compared to interferometer 110 (e.g., less than about 10 percent of $\zeta_{110}$, such as less than five percent, three percent, two percent or less), or its non-cyclic error function is known. Accordingly, the system can determine the measurement object's angular orientation during the scan to a sufficient level of accuracy to determine $\zeta_{110}$.

In some embodiments, system 300 can include one or more additional transducers to provide additional pivot axis about which the measurement object orientation can be varied. For example, an additional transducer that pivots measurement object 360 an axis parallel to the plane of FIG. 3 would allow the non-cyclic error function to be measured as a function of changes in orientation of the measurement object in a that plane.

Figure 4:
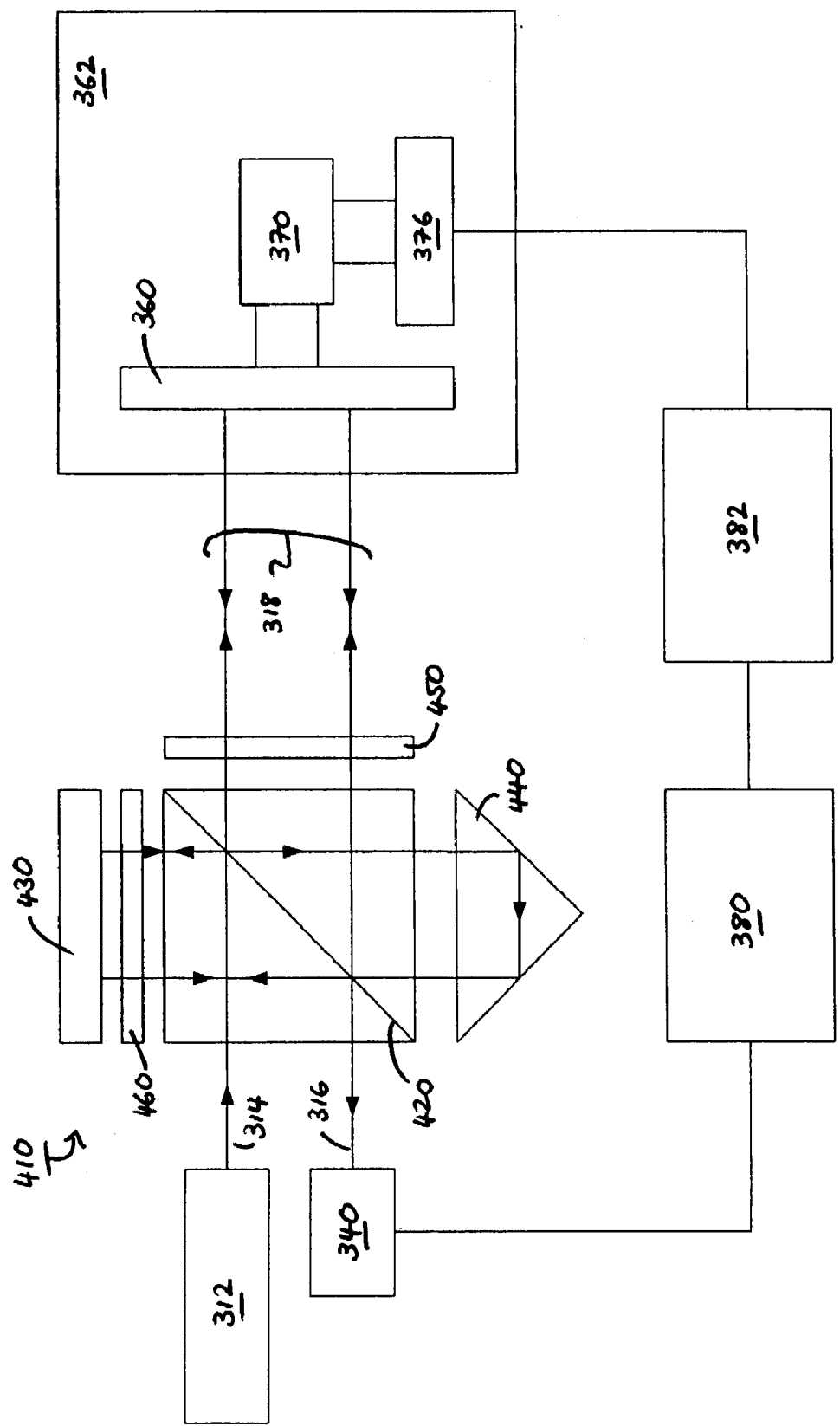
FIG. 4 is a schematic diagram of the system shown in FIG. 3 adapted to characterize a high-stability plane mirror interferometer.

To elaborate on how the system determines $\zeta_{110}$, consider an embodiment where interferometer 110 is a high-stability plane mirror interferometer (HSPMI). Referring to FIG. 4, an HSPMI 410 includes a polarizing beam splitter 420, a reference mirror 430, and a retroreflector 440. Polarizing beam splitter 420 reflects a component of input beam 314 toward reference mirror 430, and transmits a component polarized orthogonally to the reflected component towards measurement object 360. The reflected component forms the reference beam and the transmitted component forms the measurement beam. Interferometer 410 further includes quarter wave plates 450 and 460 positioned between polarizing beam splitter 420 and measurement object 360 and reference mirror 430, respectively. The fast axes of the quarter wave plates are oriented to retard the linearly polarized beams reflected and transmitted by polarizing beam splitter 420 into circularly polarized light. Reflection of the circularly polarized beams from measurement object 360 and reference mirror 430 transform the handedness of the beams to the opposite of their incident handedness. Accordingly, the quarter wave plates retard the reflected beams to linearly polarized beams with orthogonal polarization to their state prior to exiting polarizing beam splitter 420. Retroreflector 440 causes the measurement and reference beams to make a double pass to the measurement object and reference mirror, respectively, before they exit as overlapping components of output beam 316.

The geometric term, $\phi_{410}$, contributing to the phase in an HSPMI is expressed as $$\phi_{410}(\theta, d) = mk\left[2L\cos^2\theta + 2an\sin^2\left(\frac{\theta}{n}\right) + d\cos^2\theta\tan\theta\right], \quad (6)$$

where k is the freespace wavenumber, a is the one way physical length of the measurement beam path in the polarization beam splitter and reflector, n is the index of refraction of polarizing beam splitter and retroreflector, d is the offset of the pivot axis from the measurement axis, and θ is the angular orientation of measurement object 360 in the plane of FIG. 4. In Eq. (6), m is the number of passes the measurement beam makes to the measurement object. For HSMPI 410, m=2. For a single pass interferometer, for example, m=1. Accordingly, the observable phase for HSPMI 410, which is the sum of $\phi_{410}(\theta,d)$ and $\zeta_{410}(\theta,d)$, can be expressed as $$\tilde{\Phi}_{410}(\theta, d) = 2k\left[2L\cos^2\theta + 2an\sin^2\left(\frac{\theta}{n}\right) + d\cos^2\theta\tan\theta\right] + \zeta_{410}(\theta, d). \quad (7)$$

Again, $\tilde{\Phi}_{410}(\theta,d)$ and $\zeta_{410}(\theta,d)$ are expressed as functions of θ and d because these parameters are scanned in system 300.

Assuming the scanned range of θ is small (e.g., about 0.0005 radians or less) and d is constant, the geometric term in the observable phase can be accurately expressed as a power series up to quadratic order by power series expansion of the trigonometric terms in Eq. (7). The non-cyclic error function is then determined from the cubic and higher order contributions to $\tilde{\Phi}_{410}(\theta,d)$. These contributions can be determined by fitting (e.g., using a least squares fitting algorithm) a cubic or higher order polynomial function to the data, and assigning the cubic and higher order terms to the non-cyclic error function. Mathematically, the fit yields a function of the form $$\tilde{\Phi}_{410}(\theta) = \Phi^{(0)} + \Phi^{(1)}\theta + \Phi^{(2)}\theta^2 + \Phi^{(3)}\theta^3 + \ldots, \quad (8)$$

where $\Phi^{(i)}$ is the i-th coefficient in the polynomial, and the non-cyclic error function is determined as $$\zeta_{410}(\theta) = \Phi^{(3)}\theta^3 + \ldots, \quad (9)$$

Eq. (9) neglects to account for lower order contributions (e.g., quadratic and linear contributions) of the non-cyclic error function to the measured phase. However, in many end use applications, such as in lithography applications, the interferometer is calibrated to account for these errors in the field. In other words, once the interferometer has been installed in the end use system, the user scans the orientation of the measurement object using, for example, an alignment scope and an artifact (e.g., alignment mark(s)) to define a pivot point while monitoring the interferometer phase. These measurements yield a set of phase measurements with a corresponding set of angle measurements. To calibrate the interferometer, the user fits a quadratic to the phase vs. angle data, yielding a constant, and a linear and quadratic calibration coefficient. Accordingly, the lower order non-cyclic error terms are determined by the calibration procedure so that all of the terms can be corrected when the system is in use.

In addition to measuring the non-cyclic error function of interferometer 410, the acquired $\tilde{\Phi}_{410}(\theta)$ data can be used to determine the location of a measurement axis of the interferometer. The measurement axis can be defined as the axis along which phase $\tilde{\Phi}_{410}$ is independent in first order changes in the orientation of plane mirror 360. In other words, the measurement axis can be determined as the axis corresponding to the axis of the pivot points defined by the locations where $[\partial\tilde{\Phi}_{410}(\theta)/\partial\theta]=0$.

In general, interferometer 410 can also contribute cyclic errors to observable phase, $\tilde{\Phi}_{410}$. This contribution can be expressed as a cyclic error function that is additive to the observable phase. Denoting this function by $\psi_{410}$, the observable phase can be re-expressed as $$\tilde{\Phi}_{410} = \phi_{410} + \zeta_{410} + \psi_{410}. \quad (10)$$

Cyclic error function $\psi_{410}$ includes terms that are combinations of subharmonics and harmonics of $\tilde{\Phi}_{410}$, the difference frequency f of the reference and measurement beam components of input beam 314, and the Nyquist frequency $f_{Ny}$ of the electronic processor 380. Because of the term $k_1 d_1 \tan\theta_1$ in Eq. (6), the effect of cyclic error function $\psi_{410}$ can be determined and subsequently eliminated to a high accuracy by electronic processor 380 and computer 382 using an iterative spectral analysis with respect to $k_1 d_1 \tan\theta_1$. The description of the iterative spectral analysis is the same as the corresponding portion of the description given for the iterative spectral analyses in cited U.S. Pat. Nos. 6,137,574 and 6,252,668. The effects of cyclic error function $\psi_{410}$ may be eliminated or compensated by other procedures such as described in previously cited commonly owned U.S. Pat. Nos. 6,137,574, 6,252,688, and 6,246,481.

In addition to the cyclic error contribution other sources of error that contribute to the observable phase can also be compensated using methods noted in the description of system 100 above. These sources of error include, for example, time-varying effects of gas in the measurement paths of the measurement beams, contribution to the non-cyclic error function generated by errors in the figure of plane mirror measurement object, and wavefront errors in input beam.

Although the foregoing embodiment is with reference to an HSPMI, in general, interferometer 110 can be other types of interferometer, such as single pass interferometers. Moreover, interferometer 110 can include additional components to condition, redirect, or otherwise manipulate the input beam, output beam, or measurement beam. One example of interferometers that includes such additional component(s) are dynamic interferometers. Examples of dynamic interferometers are described in U.S. patent application Ser. No. 10/226,591 filed Aug. 23, 2002 and entitled "DYNAMIC INTERFEROMETER CONTROLLING DIRECTION OF INPUT BEAM" by Henry A. Hill. Typically, a dynamic interferometer includes a component called a beam steering element. A beam steering element is an element capable of changing the propagation direction a beam, usually in response to a signal based on the direction of the beam it is steering. An example of a beam steering element is a mirror coupled to a transducer that changes the orientation of the mirror based on a control signal. In dynamic interferometers, beam steering elements function to maintain the orientation of the measurement beam substantially orthogonal to a plane mirror measurement object by adjusting the direction of the measurement beam in response to changes in the orientation of the measurement object. The beam steering element may do this by contacting the input beam or measurement beam. In some embodiments, the beam steering element contacts the output beam as well.

Interferometer 110 can be a passive zero shear interferometer. Passive zero shear interferometers maintain the measurement beam orthogonal to a plane mirror measurement object by directing the input beam to contact the measurement object prior to entering the interferometer. This encodes the input beam with information about the orientation of the measurement object and ensures the measurement beam is orthogonal to the measurement object. Examples of passive zero shear interferometers are described in U.S. patent application Ser. No. 10/207,314, entitled "PASSIVE ZERO SHEAR INTERFEROMETERS," filed Jul. 29, 2002, by Henry A. Hill.

In some embodiments, interferometer 110 may include an angular displacement interferometers. Angular displacement interferometers measure changes in the direction of propagation of a beam. Angular displacement interferometers may be used with linear displacement measuring interferometers to provide interferometry systems that measure two or more degrees of freedom of a plane mirror measurement object, e.g. a linear displacement and an angular displacement. Examples of angular displacement interferometers are described in: U.S. patent application Ser. No. 10/226,591 entitled "DYNAMIC INTERFEROMETER CONTROLLING DIRECTION OF INPUT BEAM," filed Aug. 23, 2002; U.S. Provisional Application 60/314,345 filed Aug. 22, 2001 and entitled "PASSIVE ZERO SHEAR INTERFEROMETERS USING ANGLE SENSITIVE BEAMSPLITTERS," both by Henry A. Hill, and U.S. patent application Ser. No. 10/272,034 entitled "INTERFEROMETERS FOR MEASURING CHANGES IN OPTICAL BEAM DIRECTION" and filed Oct. 15, 2002 by Henry A. Hill and Justin Kreuzer. Alternatively, or additionally, interferometry systems may include one or more differential angular displacement interferometers, examples of which are also described in U.S. patent application Ser. No. 10/272,034.

In some embodiments, interferometer 110 can be a multiple pass interferometer capable of measuring more than one degree of freedom of the measurement object, such as an interferometer that simultaneously measures a displacement and orientation of the measurement object, and interferometry systems designed to reduce beam shear. Examples of interferometry systems for measuring more than one degree of freedom and for reducing beam shear are described in U.S. patent application Ser. No. 10/352,616 filed Jan. 28, 2003 and entitled "MULTIPLE-PASS INTERFEROMETRY" by Henry A. Hill. Other forms of multiple pass interferometers such as described in an article entitled "Differential interferometer arrangements for distance and angle measurements: Principles, advantages and applications" by C. Zanoni, VDI Berichte Nr. 749, 93–106 (1989) may also be characterized using system 100 and/or 300.

Figure 5:
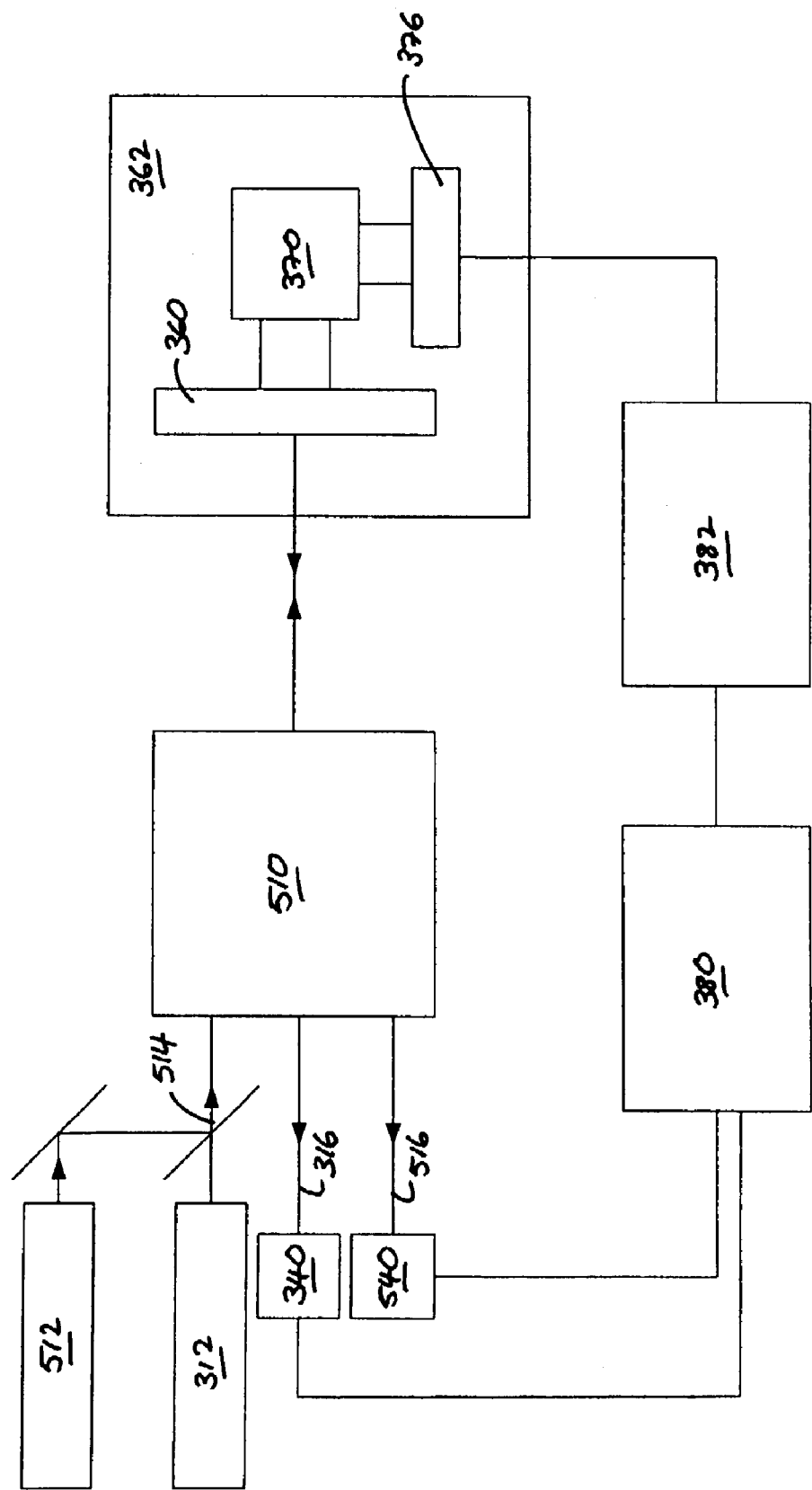
FIG. 5 is a schematic diagram of the system shown in FIG. 3 adapted to characterize a dispersion interferometer.

System 100 and/or 300 can also be adapted to characterize non-cyclic errors in dispersion interferometers. For example, FIG. 5 shows system 300 adapted to characterize non-cyclic errors associated with interferometer 510. Interferometer 510 is a two-wavelength dispersion interferometer 510 for the measurement of linear displacements of plane mirror measurement object 360 compensated for the effects of a gas in the measurement beam path. Examples of two-wavelength dispersion interferometers are described in U.S. Pat. No. 6,219,144 B1 entitled "APPARATUS AND METHOD FOR MEASURING THE REFRACTIVE INDEX AND OPTICAL PATH LENGTH EFFECTS OF AIR USING MULTIPLE-PASS INTERFEROMETRY" by Henry A. Hill, Peter de Groot, and Frank C. Demarest and U.S. Pat. No. 6,327,039 B1 by Peter de Groot, Henry A. Hill, and Frank C. Demarest.

In addition to the components described above in reference to FIG. 3, the system further includes a second source 512 that emits light having a wavelength different to that emitted by source 312. This light overlapped with light from source 312 is input beam 514. The system also includes an additional detector 540 to monitor the intensity of an output beam corresponding to the component of input beam 514 from source 512. The system monitors two observable phases, $\tilde{\Phi}_a$ and $\tilde{\Phi}_b$, corresponding to the intensity of output beams 316 and 516, respectively. The system determines two non-cyclic error functions, $\zeta_a$ and $\zeta_b$, corresponding to the two observable phases using the above-described method.

In some embodiments, the system determines non-cyclic error function $\zeta_a$ and a combination of non-cyclic error functions $\zeta_a$ and $\zeta_b$. For example, phase $\tilde{\Phi}_a$ may be used to monitor changes in linear displacement of measurement object 360 and a combination of $\tilde{\Phi}_a$ and $\tilde{\Phi}_b$ may be used to measure the effects of the gas in the measurement path. Typically, the combination of $\tilde{\Phi}_a$ and $\tilde{\Phi}_b$ that is used depends on the type of dispersion interferometer being characterized. In one type of interferometer, such as described in cited U.S. Pat. No. 6,327,039, the combination is $$\Delta\Phi = \left(\frac{\Phi_b}{k_b} - \frac{\Phi_a}{k_a}\right), \quad (11)$$

yielding a phase $\Delta\Phi$ relating to the dispersion of the gas in the measurement path where $k_a$ and $k_b$ are the wavenumbers for the beams from sources 312 and 512, respectively.

In a second type of interferometer, such as described in cited U.S. Pat. No. 6,219,144 B1, the combination is $$\Delta\Phi' = \left(\frac{\Phi_b}{p_b k_b} - \frac{\Phi_a}{p_a k_a}\right) \quad (12)$$

yielding a phase $\Delta\Phi'$ relating to the dispersion of the gas in the measurement path where $p_a$ and $p_b$ are the number of passes of the respective components of the measurement beam to the measurement object.

The combinations of non-cyclic error functions $\Delta\zeta$ and $\Delta\zeta'$ corresponding to Eq. (11) and Eq. (12), respectively, are $$\Delta\zeta = \left(\frac{\zeta_b}{k_b} - \frac{\zeta_a}{k_a}\right) \quad (13)$$

$$\Delta\zeta' = \left(\frac{\zeta_b}{p_b k_b} - \frac{\zeta_a}{p_a k_a}\right) \quad (14)$$

If the non-cyclic error functions $\zeta_a$ and $\zeta_b$ are measured instead of $\zeta_a(\zeta_b)$ and $\Delta\zeta$ or $\zeta_a(\zeta_b)$ and $\Delta\zeta'$, then either Eq. (13) or Eq. (14) can be used to compute the required value of $\Delta\zeta$ or $\Delta\zeta'$, respectively.

Interferometer 110 can be an interferometer that measures the angular displacement of a measurement object. An example of such an interferometer is shown in FIG. 6. Interferometer 610 includes polarizing beam splitters 620 and 640, reference mirrors 625 and 645, quarter wave plates 622, 624, 642, and 644, and half wave plate 650. Interferometer 610 accepts an input beam 614 from a source, splits beam 614 into two components, directed each component beam to reflect from a measurement object once, and recombines the component beams in an output beam 616.

A first linearly polarized component of input beam 614 is reflected initially by polarizing beam splitter 620 towards reference mirror 625, which reflects the first component beam back towards the polarizing beam splitter. Due to passing through quarter wave plate 622 twice, the reflected component beam's polarization state is orthogonal to its original state. Polarizing beam splitter 620 now transmits the first component due to its polarization change. Half wave plate 650 rotates the first component beam's polarization back to its original state. In this state, the first component beam is transmitted through polarizing beam splitter 640 and reflects from reference mirror 645. The double pass through quarter wave plate 642 again transforms the first components' polarization state, causing the beam to reflect from polarizing beam splitter 640 towards measurement object 660. Measurement object 660 reflects the beam back towards polarizing beam splitter 640, which now transmits the beam due to the double pass through quarter wave plate 644.

The second component of input beam 614 is polarized orthogonal to the first component, and is transmitted by polarizing beam splitter 620 and reflects from measurement object 660. The double pass through quarter wave plate 624 transforms the second components' polarization so that it is reflected by polarizing beam splitter 620 towards polarizing beam splitter 640. Half wave plate 650 rotates the component's polarization back to its original state, and polarizing beam splitter 640 reflects the beam out of interferometer 610 as a component of output beam 616.

Because the component beams contact measurement object 660 at different locations, the relative phase between the components in output beam 614 are indicative of the orientation of the measurement object with respect to interferometer 660. Variations in the orientation of the surface of measurement object 660 can be determined from the measured phase and the distance a separating the component beam paths to the measurement object 660. Examples of similar interferometers are described in U.S. patent application Ser. No. 10/352,616, entitled "MULTIPLE-PASS INTERFEROMETRY," filed Jan. 28, 2003, by Henry A. Hill.

The non-cyclic error function for interferometer 610 can be measured using systems such as system 100 or system 300 described above. In addition, by monitoring the variation of the measured phase as a function of orientation of the measurement object using system 300, one can determine the magnitude of $\alpha$. Furthermore, by measuring a with the measurement object at multiple positions, and any functional dependence of $\alpha$ on the measurement object position can be determined.

Figure 7:
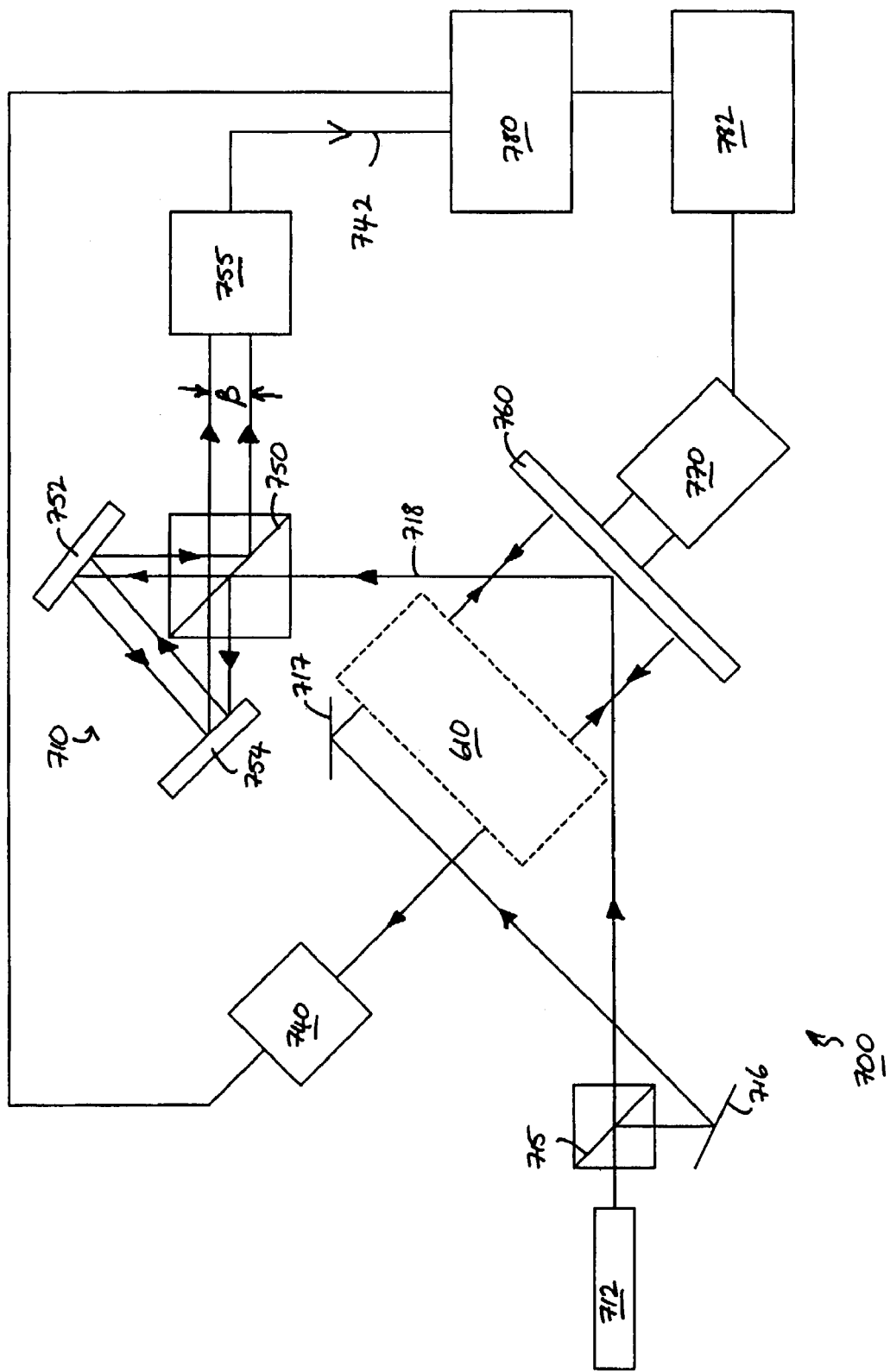
FIG. 7 is a schematic diagram of a system for characterizing non-cyclic errors of an angular displacement interferometer as a function of input beam propagation direction.

Referring to FIG. 7, a system 700 can be adapted to characterize non-cyclic errors in angular displacement interferometers. In particular, beam 718, which originates from a source 712, is used as an input beam to an angular displacement interferometer 710. A beam steering element including a mirror 760, coupled to a transducer 770, scans the propagation direction of input beam 718. A computer 782 controls the orientation of mirror 760 through transducer 770. Computer 782 is connected to an electronic processor 780, which monitors a phase $\tilde{\Phi}_{710}$ of an electrical interference signal 742 from a detector 740.

Angular displacement interferometer 710 includes a polarizing beam splitter 750 and mirrors 752 and 754. Polarizing beam splitter 750 splits input beam 718 into two orthogonal components, reflecting one component beam towards mirror 754 while transmitting the other component towards mirror 752. Mirror 754 directs the first component beam towards mirror 752, which directs the first component beam back towards polarizing beam splitter 750, striking the beam splitter's reflective surface on the opposite side from which it was first reflected. Polarizing beam splitter again reflects the first component beam, this time towards a detector 755. The transmitted component beam is reflected by mirror 752 towards mirror 754, and by mirror 754 towards polarizing beam splitter 750. Polarizing beam splitter 750 transmits the second component beam towards detector 755. Phase $\tilde{\Phi}_{710}$ is determined based on beam shear $\beta$, which in turn depends on the propagation direction of input beam 718. In the present embodiment, the relationship between $\tilde{\Phi}_{710}$ and $\beta$ is given by $\tilde{\Phi}_{710} = k\beta\theta + \zeta_{710}(\theta)$.

System 700 also includes interferometer 610, which serves as a reference interferometer by monitoring the orientation of mirror 760. A detector 740 monitors the intensity of the output beam of interferometer 610. In the present embodiment, the non-cyclic error function associated with interferometer 610 is small compared to the non-cyclic error of interferometer 710 (e.g., less than 10 percent of $\zeta_{710}$, such as less than five percent, three percent, two percent or less) or otherwise known, so computer 782 can make a substantially non-cyclic error free determination of the orientation of mirror 760 (and subsequently the propagation direction of beam 718) from interferometer 610. Accordingly, a non-cyclic error function $\zeta_{710}$ as a function of input beam propagation angle can be determined based any variation of the beam propagation direction value determined from $\tilde{\Phi}_{710}$ with a reference value determined using interferometer 610.

Although system 100 and system 300 are described as separate systems, in some embodiments they can be combined in a single system.

Figure 8A:
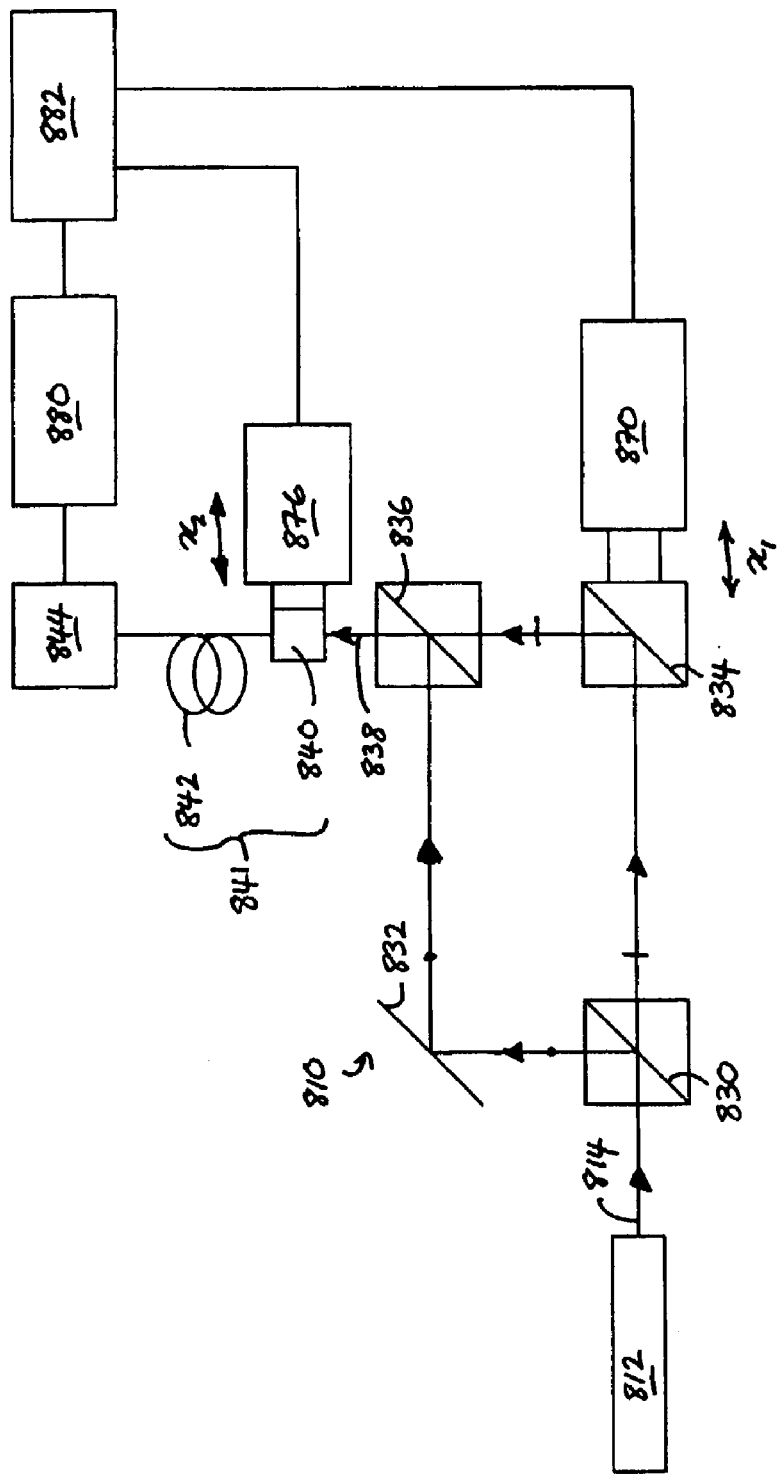
FIG. 8(a) is a schematic diagram of a system for characterizing non-cyclic errors of a fiber optic pickup.
Figure 8B:
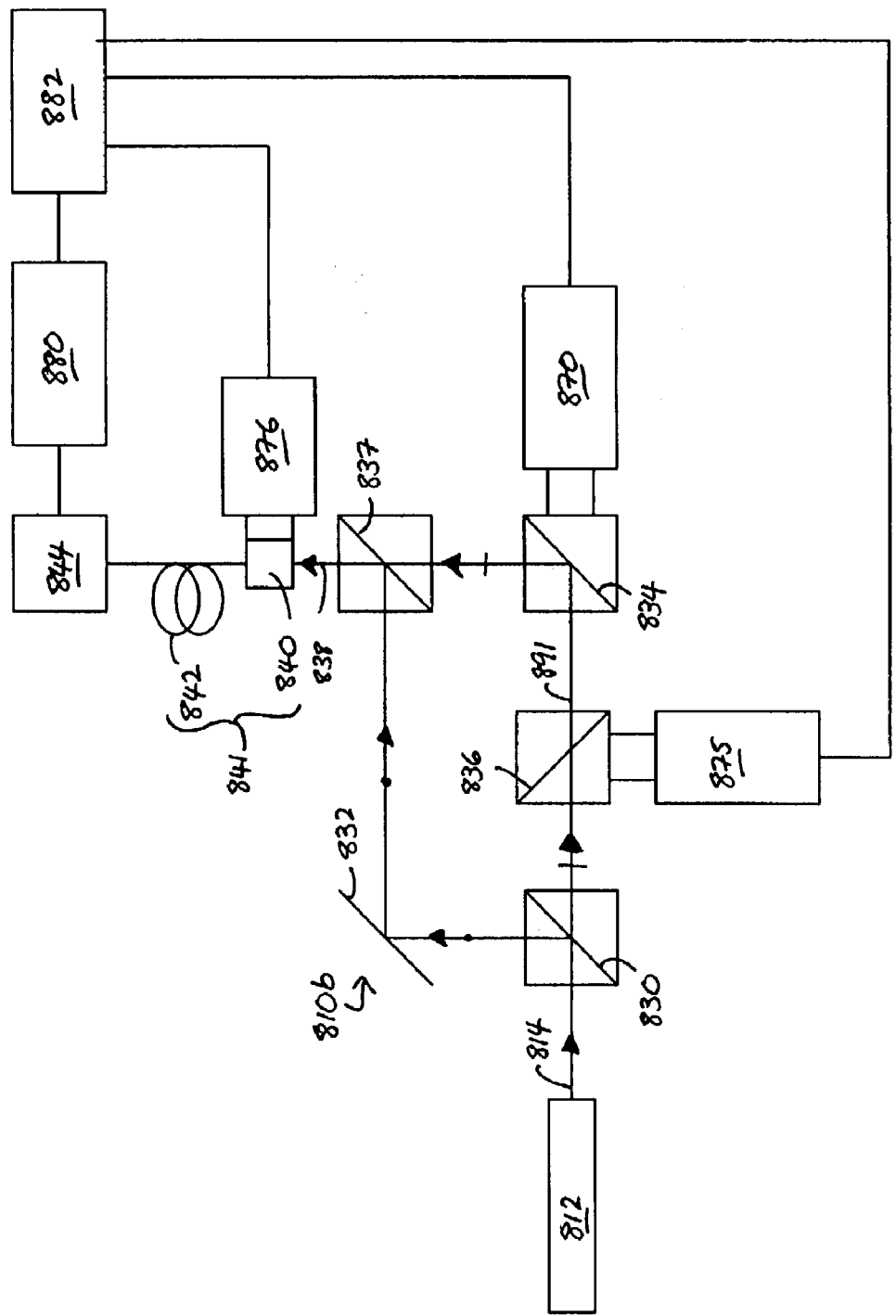
FIG. 8(b) is a schematic diagram of the system shown in FIG. 8(a) adapted to characterize non-cyclic errors in a system component.
Figure 9:
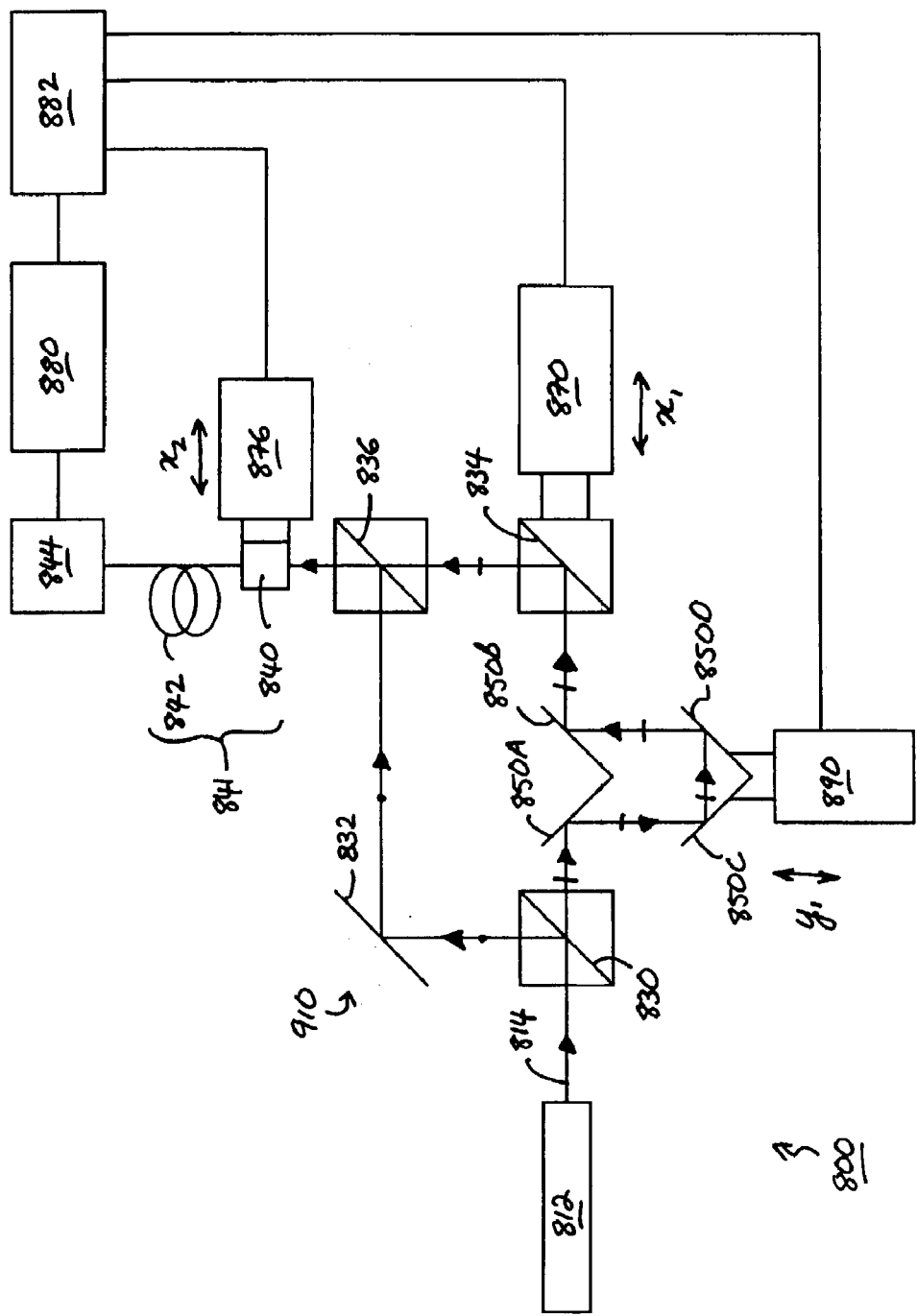
Figure 10:
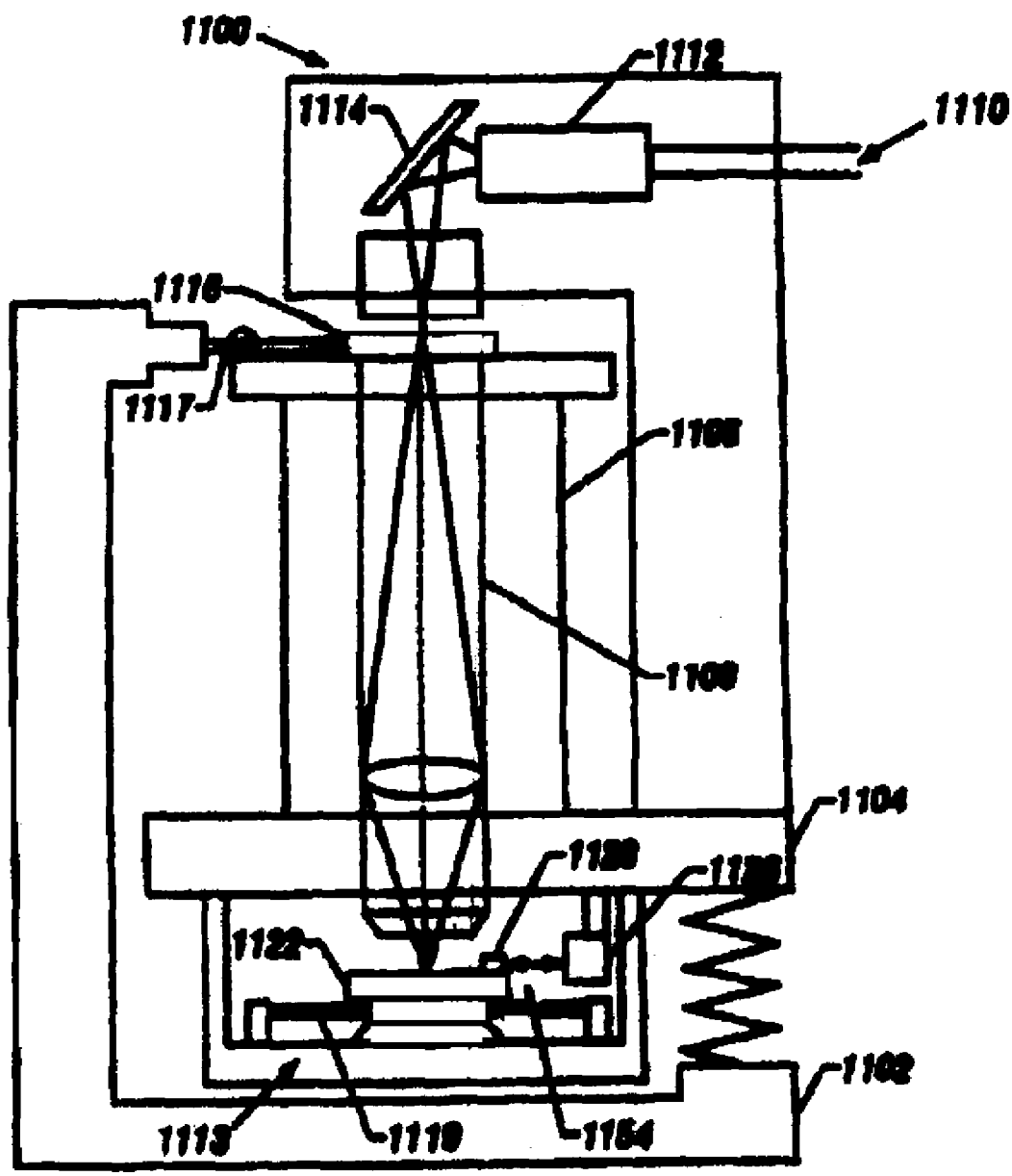
FIG. 10 is a schematic diagram of a lithography system that includes interferometry system and is used to make integrated circuits.
Figure 11A:
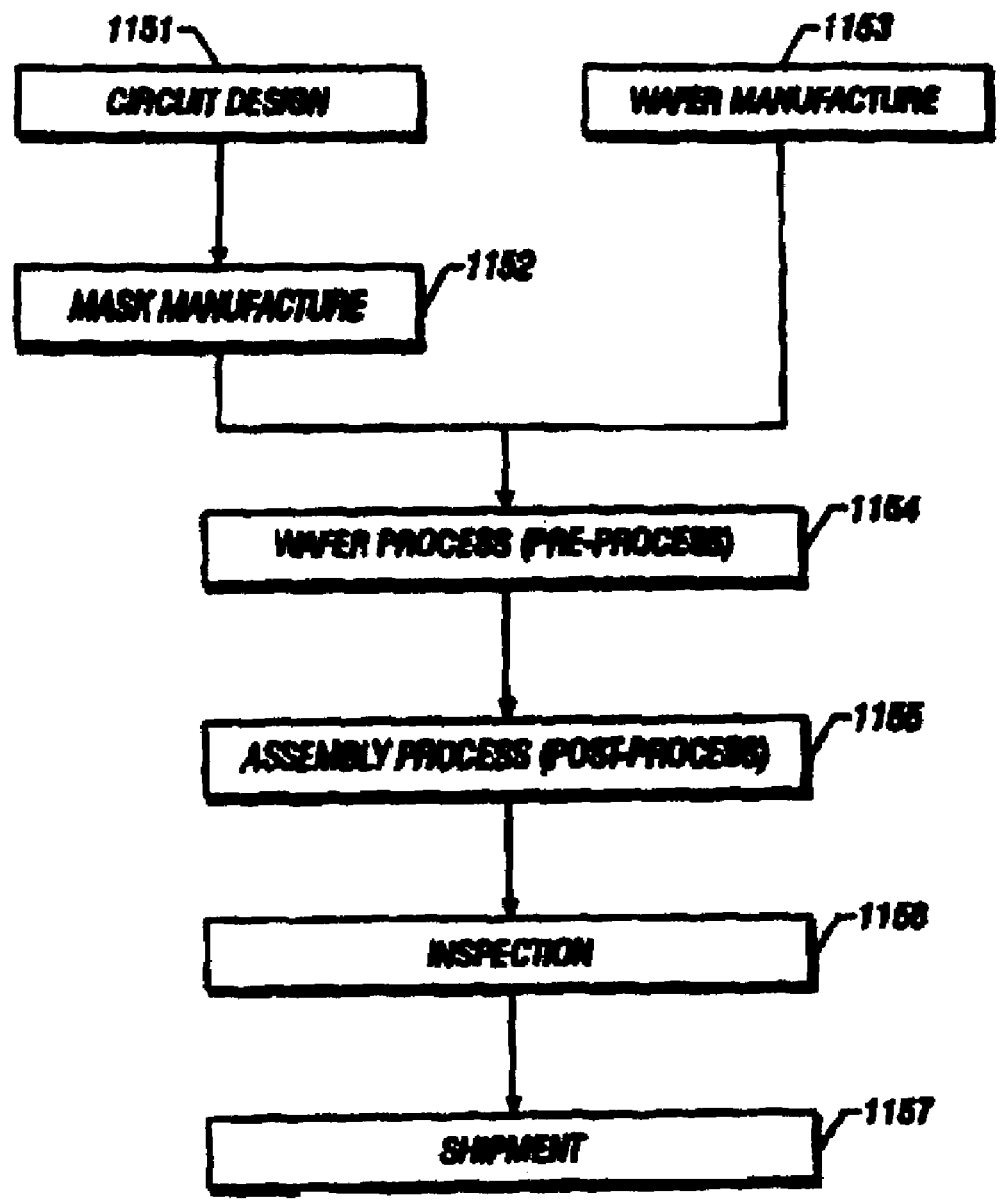
FIGS. 11(a) and 11(b) are flow charts that describe steps for making integrated circuits.
Figure 11B:
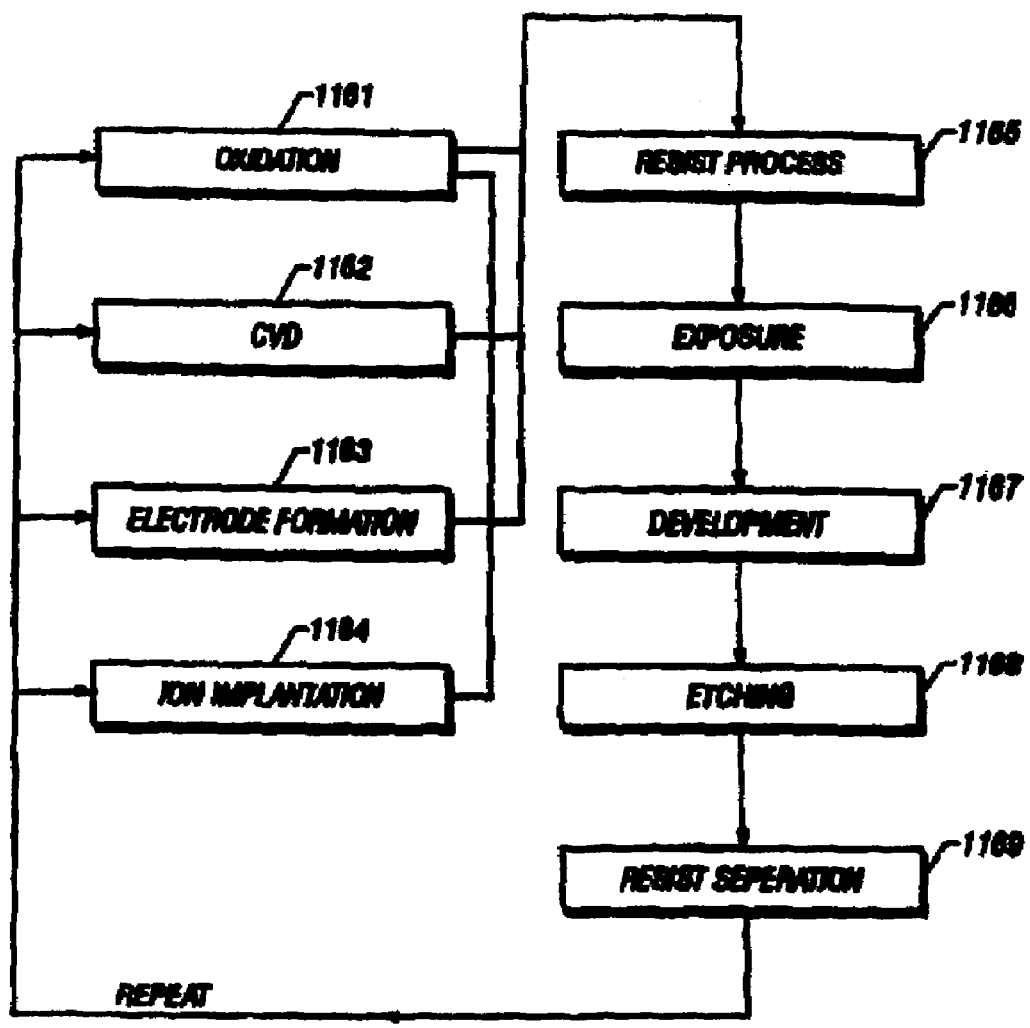
Figure 12:
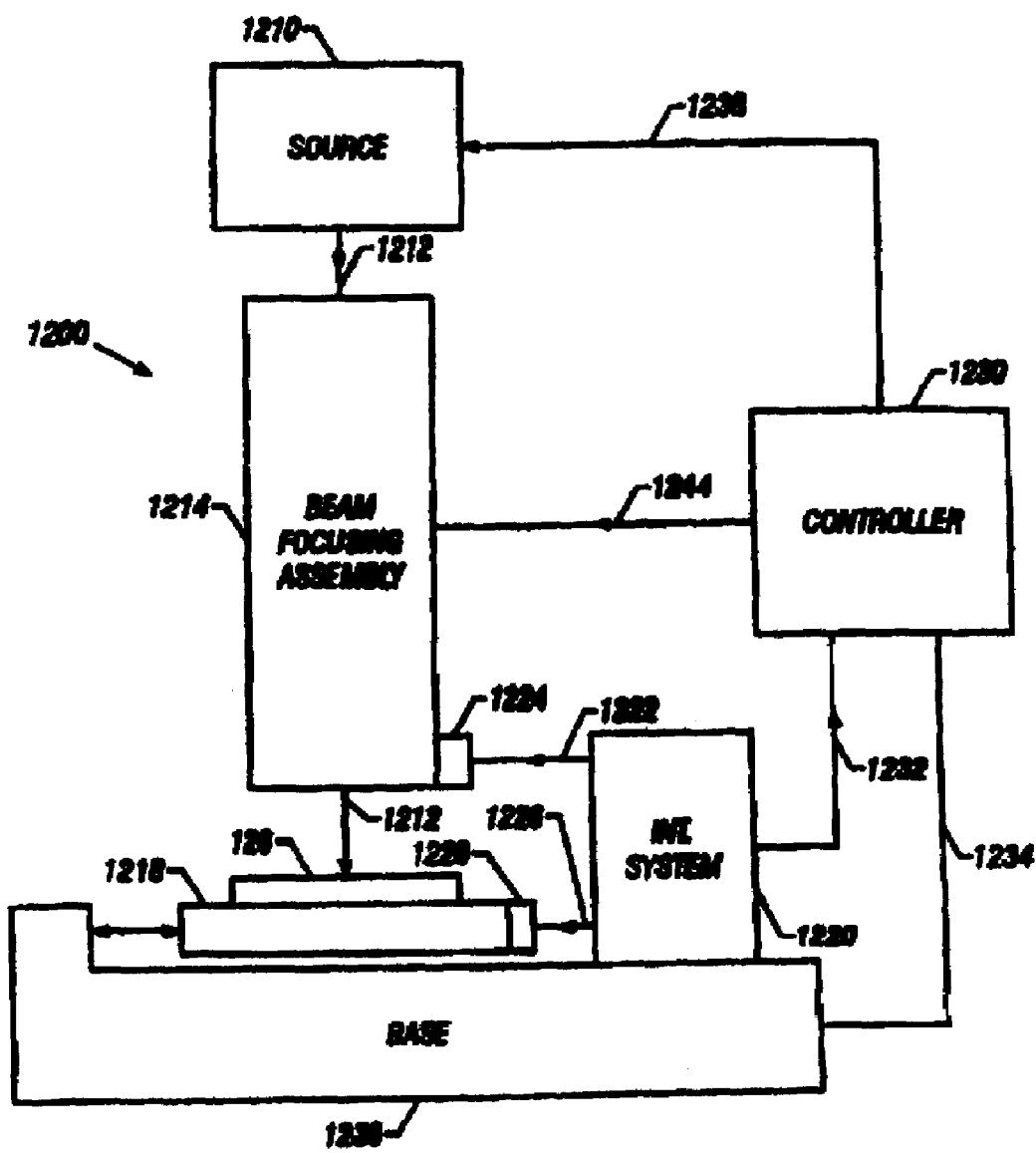
FIG. 12 is a schematic diagram of a beam writing system that includes an interferometry system.

In certain end use applications of an interferometer, the output beam is coupled into a fiber optic pickup (FOP) that transports the beam to a remotely located detector. In such applications, coupling the output beam into the FOP can further add to the non-cyclic error's contribution to the observable phase. Non-cyclic errors due to the fiber optic pickup (FOP) can be mitigated by characterizing a FOP non-cyclic error as a function of one or more parameters of an interferometer output beam. Referring to FIG. 8, a system 800 is used to characterize non-cyclic errors due to a FOP 841 as a function of beam shear in an interferometer output beam. FOP 841 includes an input coupler 840 and a fiber optic waveguide 842. System 800 includes an interferometer 810 which introduces a phase shift between two components of a two component input beam 814 from a source 812. Interferometer 810 is a Mach-Zender interferometer that includes polarizing beam-splitters 830 and 836 and mirrors 832 and 834. A first component of beam 814 polarized in the plane of FIG. 8(*a*) is transmitted by polarizing beam-splitter 830, reflected by mirror 834, and transmitted by polarizing beam-splitter 836 as a first component of output beam 838. A second component of beam 814 polarized orthogonal to the plane of FIG. 8(*a*) is reflected by polarizing beam-splitter 830, reflected by mirror 832, and reflected by polarizing beam-splitter 836 as a second component of output beam 838. Output beam 838 is incident on input coupler 840 that couples output beam 838 into fiber optic waveguide 842. Input coupler 840 typically includes an element (e.g., one or more lenses) that focuses output beam 838 onto an exposed part of a core of fiber optic waveguide 838. Input coupler 840 can also include a polarizer to sample a polarization state of output beam 838. Fiber optic waveguide 842 transmits output beam 838 to detector 844. The length of fiber optic waveguide 842 is determined by requirements of an end use application.

A change in differential beam shear of the components of beam 838 is produced by a translation of mirror 834 in the $x_1$ direction by a transducer 870, which is controlled by a computer 882. Translating mirror 834 in the $x_1$ direction changes the differential beam shear of the components of beam 838. However, because the location of mirror 834 from which the beam reflects does not change, there is no variation in the non-cyclic error contribution in the observable phase due to mirror 834. A change in common mode beam shear of the components of beam 838 relative to FOP 840 is produced translating input coupler 840 in the $x_2$ direction with a transducer 876. Transducer 876 is also controlled by computer 882. Input coupler 840 is fixedly attached to waveguide 842 so hat the input end of the waveguide moves with the input coupler. Translating input coupler 840 in the $x_2$ direction changes the common mode beam shear of the components of beam 838 relative to input coupler 840 without altering the relative phase and wavefront figures of the components of beam 838 at input coupler 840. Accordingly, system 800 can vary the common mode and differential mode beam shear of an interferometer output beam without varying non-cyclic errors associated with interferometer 810. Therefore, when using system 800 to vary the common mode and/or differential mode beam shear of the beam coupled into FOP 841, any corresponding variation in the observed phase can be attributed to non-cyclic errors in FOP 841.

Mathematically, this procedure can be expressed as follows. System 800 monitors a phase $\tilde{\Phi}_{810}(x_1,x_2)$ while varying $x_1$ and $x_2$ in a systematic fashion. Assuming other contributions to phase $\tilde{\Phi}_{810}(x_1,x_2)$ (e.g., due to cyclic errors) are negligible or otherwise compensated, the phase can be expressed as the sum of a geometric phase term $\phi_{810}(x_1)$ and the non-cyclic error function due to FOP 841, $\zeta_{FOP}(x_1,x_2)$:

$$\tilde{\Phi}_{810}(x_1,x_2)=\phi_{810}(x_1)+\zeta_{FOP}(x_1,x_2) \quad (15)$$

The geometric term, $\phi_{810}(x_1)$, corresponds to the optical path length difference between the components of beam 838, and its dependence on $x_1$ can be readily determined from interferometer 810. The non-cyclic error function is determined from the variation of the monitored phase from the geometric contribution according to the formula:

$$\zeta_{FOP}(x_1,x_2)=\tilde{\Phi}_{810}(x_1,x_2)-\phi_{810}(x_1). \quad (16)$$

For interferometer 810 $\phi_{810}(x_1)=\phi_{810}(0)+nkx_1$, where k is the wavenumber of beam 814 and n is the refractive index of the medium through which the beam components travel. Calibrating system 800 so that $\phi_{810}(0)=0$, the non-cyclic error function is determined according to $$\zeta_{FOP}(x_1,x_2)=\tilde{\Phi}_{810}(x_1,x_2)-nkx_1. \quad (17)$$

The non-cyclic error function for FOP 841 can be measured for common mode beam shears in planes other than the plane of FIG. 8(*a*) by rotating input coupler 840 about an axis parallel to the direction of propagation of beam 838. The non-cyclic error function for FOP 840 can further be measured for common mode beam shears for different angles of incidence of beam 838 at input coupler 840 by changing the angular orientation of input coupler 840.

One advantage of this system is that scanning the common mode beam shear does not alter the non-cyclic error function or alter the amplitude and phase of a cyclic error contribution.

In embodiments where beam splitter 836 is not uniform, shearing due to varying $x_1$ can introduce residual non-cyclic errors into output beam 838. These can occur because the portion of beam splitter 836 traversed by the sheared component beam varies as a function of $x_1$. Accordingly, where non-uniformities or other local defects exist in the beam splitter, they can introduce a variable contribution to the measured phase. Referring to FIG. 8(*b*), this contribution can be compensated by monitoring variations in the measured phase while scanning beam splitter 836 across a component beam 891 in one arm of an interferometer 810*b*. Interferometer 810*b* can be constructed by replacing beam splitter 836 in interferometer 810 with an equivalent beam splitter 837. A transducer 875 scans beam splitter 836 across component beam 891, mimicking the effect of varying $x_1$ in interferometer 810. Variations of the measured phase as a function of the beam splitter's position in beam 891 provide a residual error function that can be used to remove these residual errors from $\zeta_{FOP}(x_1,x_2)$.

Figure 9:
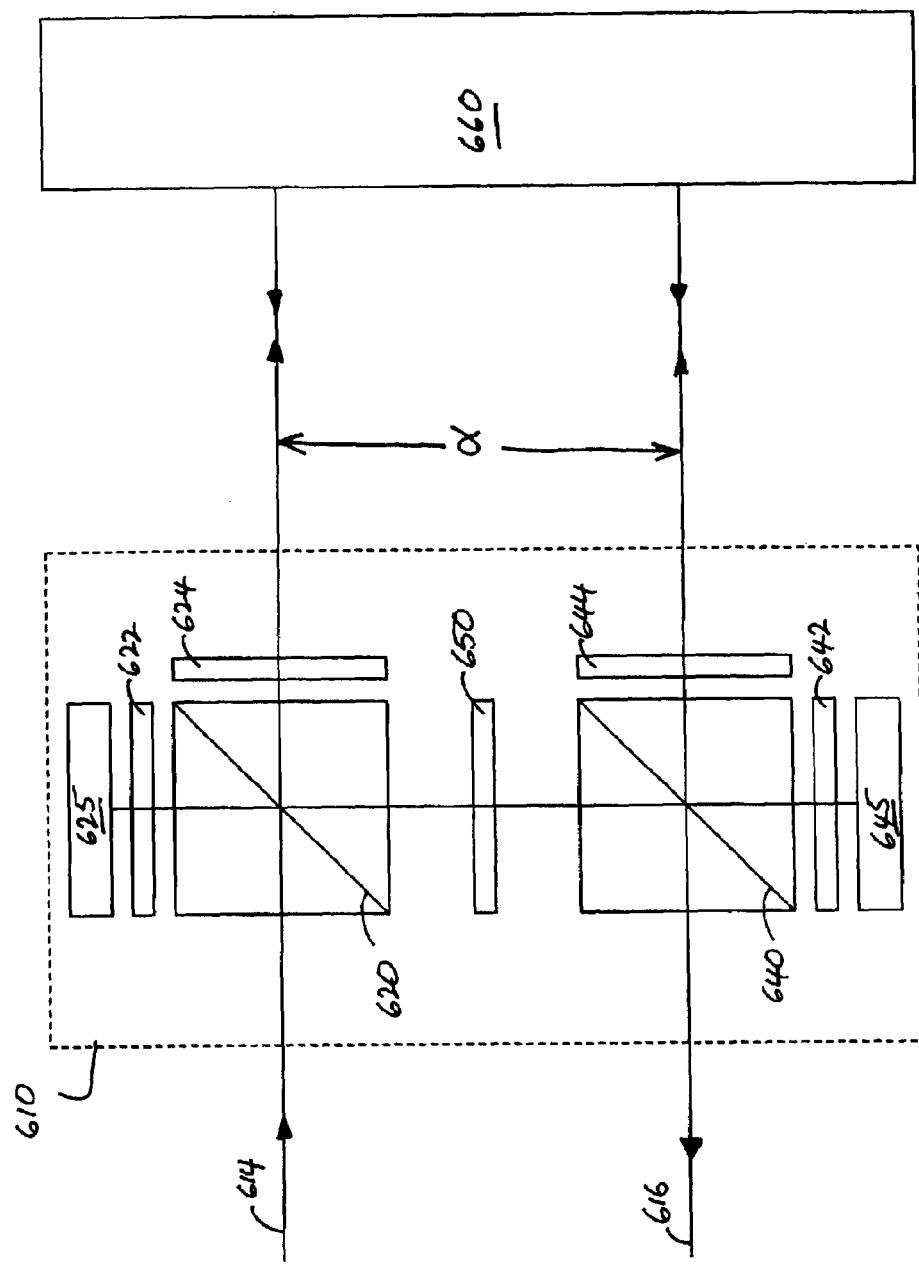
FIG. 9 is a schematic diagram of another system for characterizing non-cyclic errors of a fiber optic pickup.

Referring to FIG. 9, system 800 can be readily modified to reduce residual cyclic errors in the measured FOP non-cyclic error function. System 800 is modified by introducing a variable optical delay line in one leg of interferometer 810. The variable optical delay line includes mirrors 50A, 50B, 50C, and 50D, two of which are coupled to a transducer 890. Transducer 890 varies the optical path length traveled by one component beam by translating the position of mirrors 850C and 850D. Accordingly, the optical delay line increases the optical path length of the beam component by an amount $2y_1$, wherein $y_1$ is the one way physical path length of the optical delay line.

With the optical delay line, Eq. (15) now becomes $$\tilde{\Phi}_{810}(x_1,x_2,y_1)=\phi_{810}(x_1)+2nky_1+\zeta_{FOP}(x_1,x_2). \quad (18)$$

The contribution to phase $\tilde{\Phi}_{810}$ of residual cyclic errors can now be eliminated by scanning the physical length $y_1$ at each value of $x_1$ and $x_2$ to scan phase $2nky_1$ through a range of a number of $2\pi$ radians and averaging the measured phases.

The cyclic error contribution to the measured phase includes terms that are combinations of sub-harmonics and harmonics of $\tilde{\Phi}_{810}$, the angular difference frequency $2\pi f_1$ of the first and second beam components of beam 814, and the angular Nyquist frequency $2\pi f_{Ny}$ of the electronic processor 880. Because of the scanning of phase $2nky_1$ in Eq. (18), the effect of cyclic errors can be determined and subsequently eliminated using an iterative spectral analysis with respect to phase $2nky_1$. A description of the iterative spectral analysis is provided in cited U.S. Pat. Nos. 6,137,574, 6,252,688, and 6,246,481.

The system in which FOP 841 is ultimately used can compensate for non-cyclic errors in the FOP based on the system interferometer's beam shear. This beam shear can be determined based on the position of the measurement object as determined using the interferometer and the geometry of the interferometer. Once the system has determined the beam shear, it calculates the non-cyclic error compensation by identifying the non-cyclic error term acquired using the foregoing FOP characterization technique corresponding to the beam shear (e.g., by accessing the data from a lookup table or with an algebraic function relating the non-cyclic error term to the beam shear value). The interferometer can then repeat the measurement object position using the interferometer phase now compensated for the FOP non-cyclic errors. In some embodiments, the system can iterate the position, beam shear, and FOP non-cyclic error determinations until it converges on a value for the position.

Interferometry systems including the interferometers and interferometer components described herein may be especially useful in lithography applications used in fabricating large scale integrated circuits such as computer chips and the like. Lithography is the key technology driver for the semiconductor manufacturing industry. Overlay improvement is one of the five most difficult challenges down to and below 100 nm line widths (design rules), see for example the *Semiconductor Industry Roadmap*, p82 (1997).

Overlay depends directly on the performance, i.e. accuracy and precision, of the distance measuring interferometers used to position the wafer and reticle (or mask) stages. Since a lithography tool may produce $50–100M/year of product, the economic value from improved performance distance measuring interferometers is substantial. Each 1% increase in yield of the lithography tool results in approximately $1M/year economic benefit to the integrated circuit manufacturer and substantial competitive advantage to the lithography tool vendor.

The function of a lithography tool is to direct spatially patterned radiation onto a photoresist-coated wafer. The process involves determining which location of the wafer is to receive the radiation (alignment) and applying the radiation to the photoresist at that location (exposure).

To properly position the wafer, the wafer includes alignment marks on the wafer that can be measured by dedicated sensors. The measured positions of the alignment marks define the location of the wafer within the tool. This information, along with a specification of the desired patterning of the wafer surface, guides the alignment of the wafer relative to the spatially patterned radiation. Based on such information, a translatable stage supporting the photoresist-coated wafer moves the wafer such that the radiation will expose the correct location of the wafer.

During exposure, a radiation source illuminates a patterned reticle, which scatters the radiation to produce the spatially patterned radiation. The reticle is also referred to as a mask, and these terms are used interchangeably below. In the case of reduction lithography, a reduction lens collects the scattered radiation and forms a reduced image of the reticle pattern. Alternatively, in the case of proximity printing, the scattered radiation propagates a small distance (typically on the order of microns) before contacting the wafer to produce a 1:1 image of the reticle pattern. The radiation initiates photo-chemical processes in the resist that convert the radiation pattern into a latent image within the resist.

Interferometry systems are important components of the positioning mechanisms that control the position of the wafer and reticle, and register the reticle image on the wafer. If such interferometry systems include the features described above, the accuracy of distances measured by the systems increases as error contributions to the distance measurement are minimized.

In general, the lithography system, also referred to as an exposure system, typically includes an illumination system and a wafer positioning system. The illumination system includes a radiation source for providing radiation such as ultraviolet, visible, x-ray, electron, or ion radiation, and a reticle or mask for imparting the pattern to the radiation, thereby generating the spatially patterned radiation. In addition, for the case of reduction lithography, the illumination system can include a lens assembly for imaging the spatially patterned radiation onto the wafer. The imaged radiation exposes resist coated onto the wafer. The illumination system also includes a mask stage for supporting the mask and a positioning system for adjusting the position of the mask stage relative to the radiation directed through the mask. The wafer positioning system includes a wafer stage for supporting the wafer and a positioning system for adjusting the position of the wafer stage relative to the imaged radiation. Fabrication of integrated circuits can include multiple exposing steps. For a general reference on lithography, see, for example, J. R. Sheats and B. W. Smith, in *Microlithography: Science and Technology* (Marcel Dekker, Inc., New York, 1998), the contents of which is incorporated herein by reference.

Interferometry systems described above can be used to precisely measure the positions of each of the wafer stage and mask stage relative to other components of the exposure system, such as the lens assembly, radiation source, or support structure. In such cases, the interferometry system can be attached to a stationary structure and the measurement object attached to a movable element such as one of the mask and wafer stages. Alternatively, the situation can be reversed, with the interferometry system attached to a movable object and the measurement object attached to a stationary object.

More generally, such interferometry systems can be used to measure the position of any one component of the exposure system relative to any other component of the exposure system, in which the interferometry system is attached to, or supported by, one of the components and the measurement object is attached, or is supported by the other of the components.

An example of a lithography scanner 1100 using an interferometry system 1126 is shown in FIG. 6a. The interferometry system is used to precisely measure the position of a wafer (not shown) within an exposure system. Here, stage 1122 is used to position and support the wafer relative to an exposure station. Scanner 1100 includes a frame 1102, which carries other support structures and various components carried on those structures. An exposure base 1104 has mounted on top of it a lens housing 1106 atop of which is mounted a reticle or mask stage 1116, which is used to support a reticle or mask. A positioning system for positioning the mask relative to the exposure station is indicated schematically by element 1117. Positioning system 1117 can include, e.g., piezoelectric transducer elements and corresponding control electronics. Although, it is not included in this described embodiment, one or more of the interferometry systems described above can also be used to precisely measure the position of the mask stage as well as other moveable elements whose position must be accurately monitored in processes for fabricating lithographic structures (see supra Sheats and Smith *Microlithography: Science and Technology*).

Suspended below exposure base 1104 is a support base 1113 that carries wafer stage 1122. Stage 1122 includes a plane mirror 1128 for reflecting a measurement beam 1154 directed to the stage by interferometry system 1126. A positioning system for positioning stage 1122 relative to interferometry system 1126 is indicated schematically by element 1119. Positioning system 1119 can include, e.g., piezoelectric transducer elements and corresponding control electronics. The measurement beam reflects back to the interferometry system, which is mounted on exposure base 1104. The interferometry system can be any of the embodiments described previously.

During operation, a radiation beam 1110, e.g., an ultraviolet (UV) beam from a UV laser (not shown), passes through a beam shaping optics assembly 1112 and travels downward after reflecting from mirror 1114. Thereafter, the radiation beam passes through a mask (not shown) carried by mask stage 1116. The mask (not shown) is imaged onto a wafer (not shown) on wafer stage 1122 via aliens assembly 1108 carried in a lens housing 1106. Base 1104 and the various components supported by it are isolated from environmental vibrations by a damping system depicted by spring 1120.

In other embodiments of the lithographic scanner, one or more of the interferometry systems described previously can be used to measure distance along multiple axes and angles associated for example with, but not limited to, the wafer and reticle (or mask) stages. Also, rather than a UV laser beam, other beams can be used to expose the wafer including, e.g., x-ray beams, electron beams, ion beams, and visible optical beams.

In some embodiments, the lithographic scanner can include what is known in the art as a column reference. In such embodiments, the interferometry system 1126 directs the reference beam (not shown) along an external reference path that contacts a reference mirror (not shown) mounted on some structure that directs the radiation beam, e.g., lens housing 1106. The reference mirror reflects the reference beam back to the interferometry system. The interference signal produce by interferometry system 1126 when combining measurement beam 1154 reflected from stage 1122 and the reference beam reflected from a reference mirror mounted on the lens housing 1106 indicates changes in the position of the stage relative to the radiation beam. Furthermore, in other embodiments the interferometry system 1126 can be positioned to measure changes in the position of reticle (or mask) stage 1116 or other movable components of the scanner system. Finally, the interferometry systems can be used in a similar fashion with lithography systems involving steppers, in addition to, or rather than, scanners.

As is well known in the art, lithography is a critical part of manufacturing methods for making semiconducting devices. For example, U.S. Pat. No. 5,483,343 outlines steps for such manufacturing methods. These steps are described below with reference to FIGS. 6b and 6c. FIG. 6b is a flow chart of the sequence of manufacturing a semiconductor device such as a semiconductor chip (e.g. IC or LSI), a liquid crystal panel or a CCD. Step 1151 is a design process for designing the circuit of a semiconductor device. Step 1152 is a process for manufacturing a mask on the basis of the circuit pattern design. Step 1153 is a process for manufacturing a wafer by using a material such as silicon.

Step 1154 is a wafer process which is called a pre-process wherein, by using the so prepared mask and wafer, circuits are formed on the wafer through lithography. To form circuits on the wafer that correspond with sufficient spatial resolution those patterns on the mask, interferometric positioning of the lithography tool relative the wafer is necessary. The interferometry methods and systems described herein can be especially useful to improve the effectiveness of the lithography used in the wafer process.

Step 1155 is an assembling step, which is called a post-process wherein the wafer processed by step 1154 is formed into semiconductor chips. This step includes assembling (dicing and bonding) and packaging (chip sealing). Step 1156 is an inspection step wherein operability check, durability check and so on of the semiconductor devices produced by step 1155 are carried out. With these processes, semiconductor devices are finished and they are shipped (step 1157).

FIG. 6c is a flow chart showing details of the wafer process. Step 1161 is an oxidation process for oxidizing the surface of a wafer. Step 1162 is a CVD process for forming an insulating film on the wafer surface. Step 1163 is an electrode forming process for forming electrodes on the wafer by vapor deposition. Step 1164 is an ion implanting process for implanting ions to the wafer. Step 1165 is a resist process for applying a resist (photosensitive material) to the wafer. Step 1166 is an exposure process for printing, by exposure (i.e., lithography), the circuit pattern of the mask on the wafer through the exposure apparatus described above. Once again, as described above, the use of the interferometry systems and methods described herein improve the accuracy and resolution of such lithography steps.

Step 1167 is a developing process for developing the exposed wafer. Step 1168 is an etching process for removing portions other than the developed resist image. Step 1169 is a resist separation process for separating the resist material remaining on the wafer after being subjected to the etching process. By repeating these processes, circuit patterns are formed and superimposed on the wafer.

The interferometry systems described above can also be used in other applications in which the relative position of an object needs to be measured precisely. For example, in applications in which a write beam such as a laser, x-ray, ion, or electron beam, marks a pattern onto a substrate as either the substrate or beam moves, the interferometry systems can be used to measure the relative movement between the substrate and write beam.

As an example, a schematic of a beam writing system 1200 is shown in FIG. 7. A source 1210 generates a write beam 1212, and a beam focusing assembly 1214 directs the radiation beam to a substrate 1216 supported by a movable stage 1218. To determine the relative position of the stage, an interferometry system 1220 directs a reference beam 1222 to a mirror 1224 mounted on beam focusing assembly 1214 and a measurement beam 1226 to a mirror 1228 mounted on stage 1218. Since the reference beam contacts a mirror mounted on the beam focusing assembly, the beam writing system is an example of a system that uses a column reference. Interferometry system 1220 can be any of the interferometry systems described previously. Changes in the position measured by the interferometry system correspond to changes in the relative position of write beam 1212 on substrate 1216. Interferometry system 1220 sends a measurement signal 1232 to controller 1230 that is indicative of the relative position of write beam 1212 on substrate 1216. Controller 1230 sends an output signal 1234 to a base 1236 that supports and positions stage 1218. In addition, controller 1230 sends a signal 1238 to source 1210 to vary the intensity of, or block, write beam 1212 so that the write beam contacts the substrate with an intensity sufficient to cause photophysical or photochemical change only at selected positions of the substrate.

Furthermore, in some embodiments, controller 1230 can cause beam focusing assembly 1214 to scan the write beam over a region of the substrate, e.g., using signal 1244. As a result, controller 1230 directs the other components of the system to pattern the substrate. The patterning is typically based on an electronic design pattern stored in the controller. In some applications the write beam patterns a resist coated on the substrate and in other applications the write beam directly patterns, e.g., etches, the substrate.

An important application of such a system is the fabrication of masks and reticles used in the lithography methods described previously. For example, to fabricate a lithography mask an electron beam can be used to pattern a chromium-coated glass substrate. In such cases where the write beam is an electron beam, the beam writing system encloses the electron beam path in a vacuum. Also, in cases where the write beam is, e.g., an electron or ion beam, the beam focusing assembly includes electric field generators such as quadrapole lenses for focusing and directing the charged particles onto the substrate under vacuum. In other cases where the write beam is a radiation beam, e.g., x-ray, UV, or visible radiation, the beam focusing assembly includes corresponding optics and for focusing and directing the radiation to the substrate.

In end use applications such as in lithography tools, knowledge of an interferometer assembly's non-cyclic error function may allow the user to more rapidly calibrate the interferometer once it is installed. For example, where the application provides a means for monitoring the location of a measurement object rotation axis, the system can determine the linear and quadratic coefficients relating the measured phase to the measurement object orientation about that rotation axis using relatively few data points because the cubic and higher coefficients are already known. An example is in applications where the interferometer measures the orientation of a movable stage and the stage (or a calibration object on the stage) includes alignment marks that allow the user to accurately monitor the stage rotation axes using one or more alignment scopes.

Figure 13:
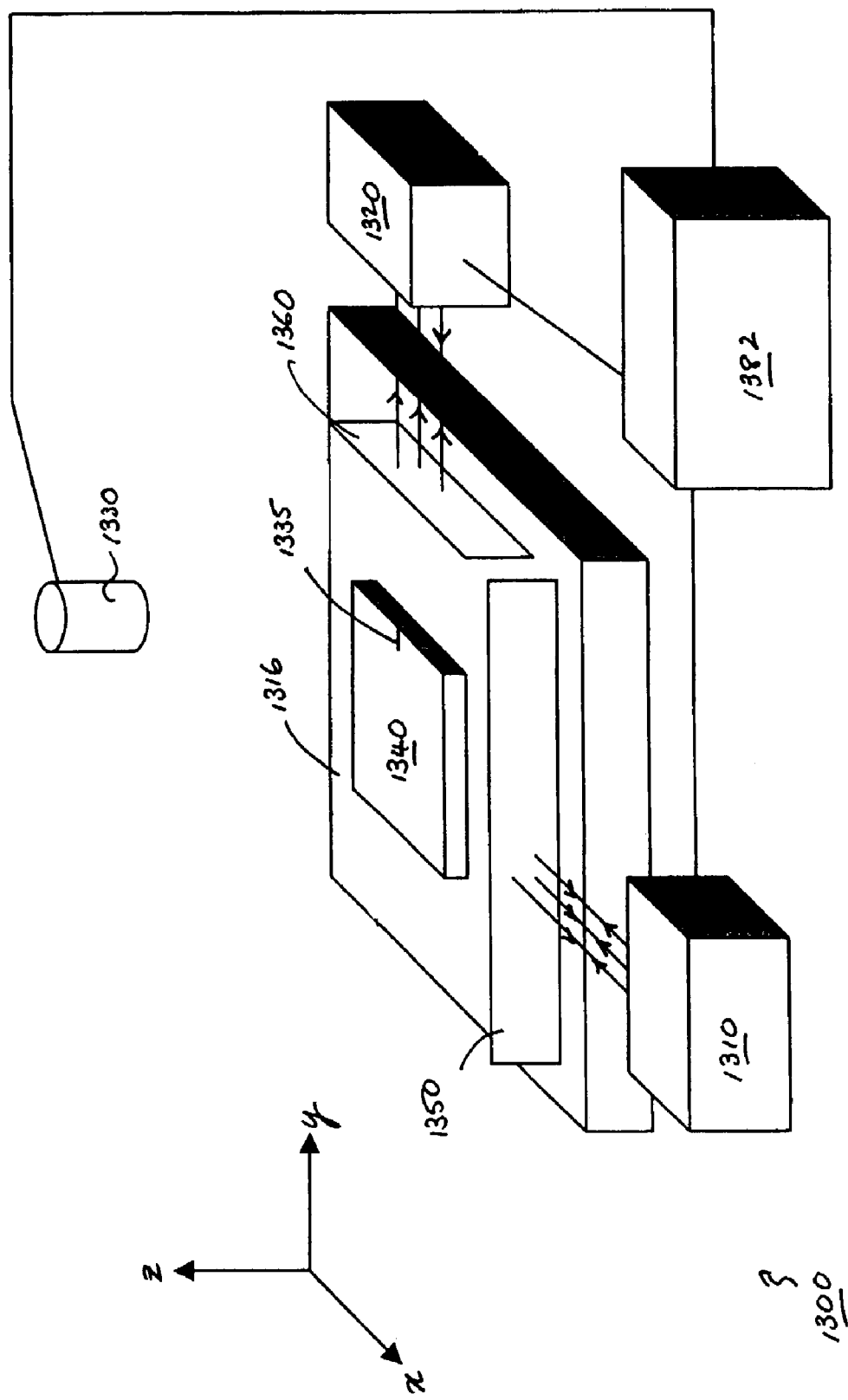
FIG. 13 is a schematic diagram of an interferometry system configured to measure the position and orientation of a movable stage.

Referring to FIG. 13, an interferometer system including interferometry subsystems 1310 and 1320 are installed in an apparatus 1300 relative to a movable stage 1316. Two plane mirror measurement objects 1350 and 1360 are fixedly mounted to stage 1316. The reflecting surface of measurement object 1350 is oriented parallel to a y-z plane (axes indicated), orthogonal to the reflecting surface of measurement object 1360, which is in the x-z plane. Apparatus 1300 also includes an alignment scope 1330 positioned relative to stage 1316 to monitor the position of an alignment mark 1335 on a calibration wafer 1340 mounted on stage 1316.

Interferometer subsystem 1310 monitors the position of stage 1316 in the x-direction, as well as angular rotation of the stage about the y and z axes as the stage translates in the y direction. Similarly, interferometer 1320 monitors the position of stage 1316 in the y-direction, and rotations of the stage about the x and z axes. Both interferometer subsystems are in communication with a computer system 1382, which determines the position and orientation of stage 1316 based on signals from the interferometer subsystems.

To calibrate the interferometry system for rotations about the z-axis, system 1300 rotates the stage's orientation about the z-axis while monitoring the location of alignment mark 1335. Any shift in the location of alignment mark 1335 during the scan indicates the alignment mark is not coincident with the rotation axis. The system translates the stage accordingly, and repeats the measurements until the alignment mark is coincident with the rotation axis. Knowledge of the rotation axis location is equivalent to knowledge of d in Eq. (7) above and reduces the number of unknowns in the equation. Once the alignment mark is coincident with the rotation axis, the system rotates the stage while monitoring the interferometers' phase. Because rotations about the z-axis affect the orientation of both plane mirror measurement objects with respect to the interferometer subsystems, both subsystems can be calibrated for these rotations simultaneously. To calibrate the interferometer, computer 1382 corrects the measured phases for non-cyclic error contributions (i.e., for cubic and higher order terms) and fits a quadratic curve to the corrected phase data. During operation of the system, the orientation of measurement object 1350 or 1360 can be determined from the measured phase and the now known functional dependence of the measured phase on the measurement object orientation.

A similar procedure can also be used to calibrate the system for rotations about other axes.

A number of embodiments of the invention have been described. Nevertheless, it will be understood that various modifications may be made without departing from the spirit and scope of the invention. For example, the non-cyclic error function for an interferometer or interferometer can be characterized as a function of input beam wavelength in addition to the test parameters described herein. Accordingly, other aspects, advantages, and modifications are within the scope of the following claims.

What is claimed is:

1. A method comprising:
   using a fiber optic pickup comprising an input coupler and a fiber to couple two input beams derived from a common source into the fiber to produce an output beam, wherein the output beam comprises information about an optical path length difference between the two input beams,
   wherein imperfections in the fiber optic pickup cause a measurable interferometric test phase derived from the output beam to deviate from the expression $\Phi=pknL$, where p is an integer, k is the wavenumber of the output beam, and nL corresponds to the optical path length difference, wherein the deviation comprises a non-cyclic error term that varies as a function of a separation of one or both of the input beams from an axis of the input coupler;
   measuring the test phase while varying the separation of at least one of the input beams from the axis;
   comparing the measured test phase to a reference phase indicative of the optical path difference; and
   determining a representation indicative of the non-cyclic error term for the fiber optic pickup based on the comparison.

2. The method of claim 1, wherein the reference phase corresponds to the test phase measured when both the input beams are coincident with the axis.

3. The method of claim 1, wherein varying the separation of at least one of the input beams from the axis comprises varying the separation between the two input beams.

4. The method of claim 1, wherein varying the separation of at least one of the input beams from the axis comprises varying the separation of both input beams from the axis as the separation between the input beams is kept constant.

5. The method of claim 1, wherein the test phase is measured while varying the separation between the two input beams and the wherein the test phase is further measured while varying the separation of both input beams from the axis as the separation between the input beams is kept constant.

6. The method of claim 1, further comprising separating a progenitor beam into two components, directing the two components along different paths, and then recombining the two components to produce an intermediate beam, wherein the two components of the intermediate beam correspond to the two input beams incident on the fiber optic pickup.

7. The method of claim 6, wherein varying the separation of at least one of the input beams from the axis comprises varying at least one of the different paths to translate one of the components in the intermediate beam.

8. The method of claim 7, wherein varying at least one of the different paths comprises translating a mirror used to direct one of the components.

9. The method of claim 6, further comprising using a Mach-Zender interferometer to separate the progenitor beam, direct the two components along the different paths, and recombine the components.

10. The method of claim 4, wherein varying the separation of both input beams from the axis as the separation between the input beams is kept constant comprises translating the input coupler with respect to the input beams.

11. The method of claim 1, wherein the input coupler comprises a focusing element that focuses the two input beams onto a core of the fiber.

12. The method of claim 11, wherein the input coupler further comprises a polarizer that samples a common polarization state of the two input beams.

13. The method of claim 1, further comprising rotating the input coupler with respect to the axis and determining the representation for different rotation angles.

14. The method of claim 1, wherein the two input beams have orthogonal polarizations.

15. The method of claim 1, wherein the common source causes the two input beams to have a heterodyne frequency splitting.

16. The method of claim 1, wherein the two input beam spatially overlap one another upon entering the fiber optic pickup.

17. The method of claim 1, wherein the axis is parallel to the two input beams.

18. The method of claim 1, wherein the representation correlates a value for the non-cyclic error term as a function of one or more correlation parameters that depends on the separation of one or both of the input beams from an axis of the input coupler.

19. The method of claim 18, wherein at least one of the correlation parameters depends on the separation between the two input beams.

20. The method of claim 19, wherein at least one of the correlation parameters depends on the separation of both input beams from the axis as the separation between the input beams is kept constant.

21. The method of claim 18, wherein the representation is a lookup table.

22. The method of claim 18, wherein the representation is an algebraic expression parameterized by the one or more correlation parameters.

23. An apparatus comprising:
a fiber optic pickup including an input coupler and a fiber configured to couple two input beams derived from a common source into the fiber to produce an output beam, wherein the output beam comprises information about an optical path length difference between the two input beams,
wherein imperfections in the fiber optic pickup cause a measurable interferometric phase derived from the output beam to deviate from the expression $\Phi = pknL$, where p is an integer, k is the wavenumber of the output beam, and nL corresponds to an optical path length difference between the two input beams, wherein the deviation comprises a non-cyclic error term that varies depending on a separation of one or both of the two input beams from an axis of the input coupler; and
an electronic storage medium providing a representation indicative of the non-cyclic error term for the fiber optic pickup.

24. The apparatus of claim 23, further comprising an electronic controller configured to couple to the electronic storage medium, wherein during operation the electronic controller corrects the interferometric phase derived from the output beam of the fiber optic pickup based on the representation in the electronic storage medium.

25. The apparatus of claim 23, wherein the input coupler comprises a focusing element configured to focus the two input beams to a core of the fiber.

26. The apparatus of claim 25, wherein the input coupler further comprises a polarizer configured to sample a common polarization state of the two input beams.

27. A lithography system for use in fabricating integrated circuits on a wafer, the system comprising:
a stage for supporting the wafer;
an illumination system for imaging spatially patterned radiation onto the wafer;
a positioning system for adjusting the position of the stage relative to the imaged radiation; and
an interferometry system including the apparatus of claim 23 for monitoring the position of the wafer relative to the imaged radiation.

28. A lithography system for use in fabricating integrated circuits on a wafer, the system comprising:
a stage for supporting the wafer; and
an illumination system including a radiation source, a mask, a positioning system, a lens assembly, and an interferometry system including the apparatus of claim 23,
wherein during operation the source directs radiation through the mask to produce spatially patterned radiation, the positioning system adjusts the position of the mask relative to the radiation from the source, the lens assembly images the spatially patterned radiation onto the wafer, and the interferometer and apparatus monitors the position of the mask relative to the radiation from the source.

29. A beam writing system for use in fabricating a lithography mask, the system comprising:
a source providing a write beam to pattern a substrate;
a stage supporting the substrate;
a beam directing assembly for delivering the write beam to the substrate;
a positioning system for positioning the stage and beam directing assembly relative one another; and
an interferometry system including the apparatus of claim 23 for monitoring the position of the stage relative to the beam directing assembly.

30. A method comprising:
positioning an interferometer relative to a measurement object, wherein during operation of the interferometer directs two beams along different paths and then combines them to produce an output beam, wherein at least one of the beams contacts the measurement object and the output beam comprises information about an optical path length difference between the two beams;
transporting the output beam with a fiber optic pickup to a detector positioned at a location remote from the interferometer,
wherein imperfections in the fiber optic pickup cause a measurable interferometric phase derived from the output beam to deviate from the expression $\Phi = pknL$, where p is an integer, k is the wavenumber of the output beam, and nL corresponds to the optical path length difference, wherein the deviation comprises a non-cyclic error term that depends on the separation of the output beam components from an axis of the fiber optic pickup;

correcting the measured phase based on a representation indicative of the non-cyclic error term for the fiber optic pickup; and monitoring the position of the measurement object based on the corrected phase.

31. A lithography method for use in fabricating integrated circuits on a wafer, the method comprising:

supporting the wafer on a moveable stage;
imaging spatially patterned radiation onto the wafer;
adjusting the position of the stage; and
monitoring the position of the stage using the method of claim 30.

32. A lithography method for use in the fabrication of integrated circuits comprising:

directing input radiation through a mask to produce spatially patterned radiation;
positioning the mask relative to the input radiation;
monitoring the position of the mask relative to the input radiation using the method of claim 30; and
imaging the spatially patterned radiation onto a wafer.

33. A lithography method for fabricating integrated circuits on a wafer comprising:

positioning a first component of a lithography system relative to a second component of a lithography system to expose the wafer to spatially patterned radiation; and
monitoring the position of the first component relative to the second component using the method of claim 30.

34. A method for fabricating integrated circuits, the method comprising the lithography method of claim 31.

35. A method for fabricating integrated circuits, the method comprising the lithography method of claim 32.

36. A method for fabricating integrated circuits, the method comprising the lithography method of claim 33.

37. A method for fabricating integrated circuits, the method comprising using the lithography system of claim 27.

38. A method for fabricating integrated circuits, the method comprising using the lithography system of claim 28.

39. A method for fabricating a lithography mask, the method comprising:

directing a write beam to a substrate to pattern the substrate;
positioning the substrate relative to the write beam; and
monitoring the position of the substrate relative to the write beam using the method of claim 30.

* * * * *